United States Patent
Weder et al.

(10) Patent No.: US 6,594,062 B1
(45) Date of Patent: Jul. 15, 2003

(54) EFFICIENT PHOTOLUMINESCENT POLARIZERS, PROCESS FOR FORMING, AND APPLICATION IN DISPLAY DEVICES

(75) Inventors: Christoph Weder, Gattikon (CH); Cees Bastiaansen, Maastricht (NL); Andrea Montali, Zürich (CH); Paul Smith, Zürich (CH)

(73) Assignee: Landqart, Landqart (CH)

( * ) Notice: Subject to any disclaimer, the term of this patent is extended or adjusted under 35 U.S.C. 154(b) by 0 days.

(21) Appl. No.: 09/601,254

(22) PCT Filed: Jan. 26, 1999

(86) PCT No.: PCT/IB99/00137

§ 371 (c)(1),
(2), (4) Date: Jun. 13, 2001

(87) PCT Pub. No.: WO99/39222

PCT Pub. Date: Aug. 5, 1999

(30) Foreign Application Priority Data

Jan. 29, 1998 (EP) ................................. 98101520

(51) Int. Cl.[7] ........................... G02F 1/03; G02F 1/07
(52) U.S. Cl. ........................................ 359/245; 359/246
(58) Field of Search ........................... 359/244, 245, 359/246; 313/527, 528, 530, 532, 539, 541, 542

(56) References Cited

U.S. PATENT DOCUMENTS 6,295,106 B1 * 9/2001 Fukuzawa et al. .......... 349/159

OTHER PUBLICATIONS

Andrea Montali et al. "Polarizing Energy Transfer in Photoluminescent Materials for Display Applications", Letters to Nature, vol. 392, Mar. 19, 1998, pp. 261–264.

Christoph Weder et al. "Highly Polarized Luminescence from Oriented Conjugated Polymer/Polyethylene Blend Films", Advanced Materials, vol. 9, No. 13, Nov. 3, 1997, pp. 1035–1039

Birendra Bahadur et al. "Liquid Crystal Displays", Moleculer Crystals and Liquid Crystals, vol. 109, 1984, pp. 3–98.

Christoph Weder et al. "Incorporation of Photoluminescent Polarizers into Liquid Crystal Displays", Science, vol. 279, Feb. 6, 1998, pp. 835–837.

* cited by examiner

Primary Examiner—Ricky Mack
(74) Attorney, Agent, or Firm—Morgan, Lewis & Bockius LLP

(57) ABSTRACT

PL polarizers are disclosed which are characterized in a low degree of polarization in their absorption and a high degree of polarization in their emission. The invention also discloses methods to produce such PL polarizers. Also, the invention discloses display devices of high brightness and contrast which comprise at least one photoluminescent polarizer which is characterized in a low degree of polarization in their absorption and a high degree of polarization in their emission.

39 Claims, 12 Drawing Sheets

| □ | 2 % EHO-OPPE/DMC |
| ◇ | 2/4 % EHO-OPPE/DMC |
| ✳ | 2/1 % EHO-OPPE/DMC |
| ■ | 0.2/2 % EHO-OPPE/DMC |

- 2% HMW-EHO-OPPE/DMC
- 1% MEH-PPV/DMC

- ☐ C138, 365nm
- ◇ BPO, 306nm
- ✶ BPEB, 365nm
- ■ PAC, 365nm
- ● MOC, 320nm

EFFICIENT PHOTOLUMINESCENT POLARIZERS, PROCESS FOR FORMING, AND APPLICATION IN DISPLAY DEVICES

FIELD OF THE INVENTION

The present invention relates to photoluminescent polarizers and in particular to photoluminescent polarizers which are characterized in a low degree of polarization in their absorption and a high degree of polarization in their emission. The invention also relates to methods to produce the latter. Also, the invention relates to the application of these photoluminescent polarizers in display devices.

BACKGROUND OF THE INVENTION

Linear sheet polarizers, which convert unpolarized into linearly polarized light are well known in the art and are of major importance in a large variety of applications (L. K. M. Chan in "The Encyclopedia of Advanced Materials", Vol. 2, D. Bloor, T. J. Brook, M. C. Flemings, S. Mahajan, eds., pp. 1294–1304 (1994), Elsevier Science Ltd., Oxford; D. S. Kliger et al. "Polarized Light in Optics and Spectroscopy" (1990), Academic Press, San Diego; T. J. Nelson et al. "Electronic Information Display Technologies" (1997), World Scientific Publishing, Singapore). However, the presently employed polarizers suffer from severe limitations some which are summarized below.

The vast majority of linear sheet polarizers presently used, are dichroic polarizers which are based on an invention by Land et al. (E. H. Land, J. Opt. Soc. Am., Vol. 4, pp. 957 (1951)). As well established in the prior art, dichroic polarizers are produced from oriented, synthetic polymers which contain oriented dichroic species. Dichroic polarizers operate by the absorption of one polarization direction of incident light, thus, a dichroic polarizer which generates perfectly, linearly polarized light absorbs 50% or more of unpolarized, incident light (D. S. Kliger et al. "Polarized Light in Optics and Spectroscopy" (1990), Academic Press, San Diego). Consequently, dichroic polarizers convert at least 50% of the incident optical energy into heat which severely limits the efficiency of these polarizers and causes problems due to the excessive heating in combination with high-intensity light sources.

As an alternative to dichroic polarizers, polarizers have been proposed that are based on selective reflection or scattering of one polarization and allow recycling of the reflected or scattered light (European Patent EP 0 606 940 A2; World Patent WO 9735219 A1; U.S. Pat. Nos. 5,325, 218; 5,422,756; 5,528,720; 5,559,634; M. Schadt et al., Jap. J. Appl. Phys., Vol. 29, pp. 1974–1984 (1990); D. J. Broer et al., Nature, Vol. 378, pp. 467–469 (1995); D. Coates et al., SID 96 Applications Digest, pp. 67–70 (1996)) or scattering (Y. Dirix, "Polarizers based on anisotropic absorbance or scattering of light", Ph. D. thesis, Technische Universiteit Eindhoven, Eindhoven. The Netherlands (1997)). However, these polarizers also suffer a number of severe drawbacks. All above referred reflecting or scattering polarizers, due to their working principle, require additional light-recycling systems and other additional elements which render them rather uneconomical. Some of these polarizers initially produce circularly rather than linearly polarized light (D. J. Broer et al., Nature, Vol. 378, pp. 467–469 (1995)) and require expensive quarter-wave converters to produce linearly polarized light, or are manufactured by processes with intrinsic limitations for the production of large area, flexible polarizing films.

As is well known in the art, the production of linearly polarized, chromatic (colored) light, which is essential for many technical applications, including liquid-crystal displays, presents another obstacle. Polarized, colored light is usually obtained by the use of multiple elements: a polarizer and one or multiple color filters (L. K M. Chan in "The Encyclopaedia of Advanced Materials", Vol. 2, D. Bloor, T. J. Brook, M. C. Flemings, S. Mahajan, eds., pp. 1294–1304 (1994), Elsevier Science Ltd., Oxford). The vast majority of color filters presently used are absorbing color filters which convert a major fraction, i.e. usually 80%, of incident light into thermal energy (T. J. Nelson et al. "Electronic Information Display Technologies" p. 244 (1997), World Scientific Publishing, Singapore) and, thus, also create severe limitations with respect to energy efficiency, brightness and accumulation of thermal energy. As an alternative to absorbing color filters, the use of photoluminescent (PL), for example fluorescent or phosphorescent matter as "active" color filters has also been described (German patent No. DE 2640909 C2; French application FR 2 600 451-A1: U.S. Pat. Nos. 3,844,637; 4,113,360; 4,336,980; 4,394,068; 4,470,666; 4,678,285; 5,018,837; 5,608.554; G. Baur et al., Appl. Phys. Lett., Vol. 31, pp. 4–6 (1977); M. Bechtler et al., Electronics, December 8, pp. 113–116 (1977); W. Greubel et. al., Elektronik, pp. 55–56 (1977); H. J. Coles, Liq. Cryst., Vol. 14, pp. 1039–1045 (1993); W. A. Crossland et al., Proc. SID Symp. Digest of Technical Papers, Vol. 27, pp. 837–840 (1997)). However, the proposed structures suffer from a number of drawbacks that are related to the limited stability and efficiency of the fluorescent dyes the difficulty to produce structured materials, depolarization effects, or the required thickness and (large) area of the luminescent layer.

Recently, some PL materials have been demonstrated to combine the functions of a linear polarizer and a color filter and to yield linearly polarized, chromatic light in one single element (Ch. Weder et al., Adv. Mat., Vol. 9, pp. 1035–1039 (1997)). When processed into appropriate forms, these PL materials can be used as PL polarizers which lead to a substantial increase in device brightness and efficiency when used instead of a dichroic polarizer and an absorbing color filter, for example in liquid-crystal display devices. In addition, PL polarizers offer a significant simplification in device design, because they combine the functions of two elements. The prior art PL polarizers comprise uniaxially oriented, formanisotropic, PL substances, which after photoexcitation emit linearly polarized light. This effect is well known in the art; it was demonstrated in inorganic crystals more than a century ago (E. Lommel, Ann. d. Physik und Chemie. Vol. 8. pp. 634–640 (1879)) and in oriented blends of ductile polymers and low-molecular weight PL materials as early as the 1930's (A. Jablonski, Acta Phys. Polon., Vol. A 14, pp. 421–434 (1934)). Since, the effect has been shown in a variety of systems (J. Michl et al. "Spectroscopy with polarized light" (1986), VCH Publishers, New York) including, for example, oriented blends of ductile polymers and oligomeric PL materials (M. Hennecke et al., Macromolecules, Vol. 26, pp. 3411–3418 (1993)), uniaxially oriented PL polymers (P. Dyreklev et al., Adv. Mat., Vol. 7, pp. 43–45 (1995)) or blends thereof and a ductile polymer (U.S. Pat. No. 5,204,038; T. W. Hagler et al., Polymer Comm., Vol. 32, pp. 339–342 (1991); T. W. Hagler et al. Phys. Rev., Vol. B 44, pp. 8652–8666 (1991); Ch. Weder et al., Adv. Mat., Vol. 9, pp. 1035–1039 (1997)), liquid crystal systems (N. S. Sariciftci et al., Adv. Mater., Vol. 8, p. 651 (1996); G. Lüssem et al., Adv. Mater., Vol. 7, p. 923 (1995)) or oriented PL materials grown onto orienting substrates (K.

Pichler et al., Synth. Met., Vol. 55–57, p. 454 (1993); N. Tanigaki et al., Mol. Cryst. Liq. Cryst., Vol. 267, p. 335 (1995); G. Lüssem et al., Liq. Cryst., Vol. 21, p. 903 (1996); R. Gill et al., Adv. Mater. Vol. 9, pp. 331–334 (1997)). The efficiency of PL polarizers is limited by the quantum yield of the PL material which, in principle, can approach unity (B. M. Krasovitskii et al. "Organic Luminescent Materials" (1988), VCH, Weinheim). Unfortunately, the uniaxial orientation of the formanisotropic, PL substances in the PL polarizers, which have been described in the prior art, not only gives rise to an anisotropic, that is, linearly polarized, emission, buts also to an anisotropic absorption. Consequently, only one polarization direction of unpolarized incident light is optimally absorbed and used for photoexcitation, while the other polarization direction is, at least partially, wasted. As a result, the prior art PL polarizers are still limited in brightness, energy efficiency and contrast and have to be used in conjunction with light recycling systems and cutoff-filters as disclosed in the prior art.

In summary, the above improvements have failed to yield materials and, in particular, PL materials and polarizers manufactured thereof, that efficiently convert unpolarized light into linearly polarized, chromatic light. The need, thus, continues to exist for materials and devices made thereof which, in an economical and satisfactory way, allow the efficient generation of polarized, chromatic light.

SUMMARY OF THE INVENTION

One object of the present invention to overcome the problems related to the prior art PL polarizers, is to provide PL materials and PL polarizers made thereof which are characterized in a high degree of polarization in their emission and a low degree of polarization in their absorption.

Another object of the present invention is to provide methods for the preparation of PL materials and PL polarizers thereof which are characterized in a high degree of polarization in their emission and a low degree of polarization in their absorption.

Still another object of the present invention is to provide display devices that comprises at least one PL polarizer that is characterized in a high degree of polarization in its emission and that is characterized in a low degree of polarization in its absorption.

Other objects of the present invention will become apparent to those skilled in the art in the following detailed description of the invention and the appended claims.

The present invention is based on our surprising finding that the foregoing and other objects are achieved by making and using materials that display a novel phenomenon which hereinafter is explained in detail and referred to as polarizing energy transfer. As noted heretofore, only a portion of the available energy of unpolarized excitation light is absorbed (and at most only that portion is subsequently re-emitted as linearly polarized light) by the prior art PL polarizers. Most importantly, we have now found that the properties, particularly brightness and efficiency, of such PL materials and products made thereof can be dramatically improved, by incorporating auxiliary luminescent centers or sensitizers. More specifically, we have found that in materials which comprise an appropriate, usually essentially randomly oriented sensitizer, that maximally harvests optical energy by essentially isotropic absorption, a polarizing energy transfer may occur during which the absorbed energy is efficiently transferred to a, usually uniaxially oriented, emitter which, subsequently, emits highly linearly polarized light. The general concept of sensitization in PL materials is well known in the art, and is applied in various technical applications such as lasers (U.S. Pat. No. 4,081,761) or daylight-fluorescent paints (B. M. Krasovitskii et al. "Organic Luminescent Materials" (1988), VCH, Weinheim). Usually, the sensitization in these systems arises from an electronic energy transfer process between a luminescent center which absorbs incident light and a luminescent material (usually in close proximity to the luminescent center) that subsequently (at least partially) re-emits this energy. While such classic energy transfer processes have been investigated in great detail (T. Förster, Ann. Phys., Vol. 2 p. 55 (1948); D. L. Dexter. J. Chem. Phys., Vol. 21, pp. 836–850 (1953); A. Gilbert et al. "Essentials of Molecular Photochemistry" (1991), Blackwell Science, Cambridge; S. E. Webber, Chem. Rev., Vol. 90, pp. 1469–1482 (1990); N. L. Vekshin "Energy Transfer in Macromolecules" (1997), SPIE Optical Engineering Press, Washington), the materials of the present invention exhibit a polarizing energy transfer process, which was not reported or suggested before. We have now found, that these new materials enable the fabrication of highly efficient PL polarizers. Moreover we found that the latter, when used in PL display devices, lead to significant improvement in brightness and energy efficiency of these devices compared to the prior-art.

DEFINITIONS

Photoluminescent and photoluminescence are hereinafter abbreviated with the designation PL.

The designation PL polarizer refers to a, for instance, shaped material that is characterized in exhibiting photoluminescence. The PL polarizer may be of many useful forms, for example, but not limited to, a fiber, rod, film, sheet, layer, tape or plate, which may be homogeneous and continuous, and may be structured or patterned, and may comprise multiple individual elements, zones or pixels, or arrays thereof.

To clarify the operation of the devices and the conditions of experiments, the following common definitions of the several axes will be used:

The polar axis of a linear polarizer or analyzer is the direction of the electrical field vector of the light that is transmitted by the polarizer films. The PL polarizer axis is the direction of the electrical field vector of the light emitted by the PL polarizer.

Herein, the degree of emission polarization of a PL polarizer (also referred to as degree of polarization in emission) is expressed as the emission dichroic ratio (also referred to as dichroic ratio in emission) of the PL polarizer. The emission dichroic ratio is defined as the ratio of the integrated emission spectra measured through a linear polarizer (analyzer) with its polar axis parallel and perpendicular to the PL polarizer axis, using unpolarized excitation light.

Herein, the degree of absorption polarization of a PL polarizer (also referred to as degree of polarization in absorption) is expressed as the absorption dichroic ratio of the PL polarizer. The absorption dichroic ratio is defined as the ratio of the absorption measured with incident light linearly polarized parallel and perpendicular to the PL polarizer axis, measured at the wavelength used for excitation of the PL polarizer.

Herein, a sensitizer is defined as a species and/or moiety and/or domain, which, at least at one wavelength that can be used for photoexcitation, gives rise to a substantial, essentially isotropic absorption by the PL polarizer in which it is comprised; it is further characterized in that it transfers the absorbed energy, at least partially, to an emitter, if the latter is also comprised in the PL polarizer.

Herein, an emitter is defined as a species and/or moiety and/or domain, which gives rise to a significantly anisotropic, that is linearly polarized, photoemission of the PL polarizer in which it is comprised.

Herein, the excitation wavelength is defined as the wavelength that is used for excitation of a PL polarizer.

Herein the terms absorption and emission relate to optical processes.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1A:
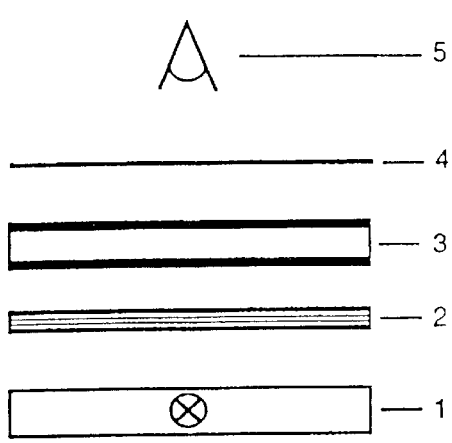
FIGS. 1 A–G are schematic structures of possible display devices according to embodiments of the present invention.

The present invention is based on our surprising finding that PL polarizers which are characterized in a high degree of polarization in their emission and a low degree of polarization in their absorption can be produced by making and using materials that display the novel phenomenon of polarizing energy transfer. Most importantly, we found that this polarizing energy transfer is achieved in PL materials which in an adequate manner comprise an essentially isotropically absorbing sensitizer and a polarized-light radiating emitter. These new materials and PL polarizers made thereof exhibit dramatically improved properties, particularly brightness and efficiency, when compared to those of the prior art. We also have now found that these novel PL polarizers, when used in PL display devices, lead to significant improvement in brightness and energy efficiency of these devices compared to those of the prior-art.

Characteristics of PL Polarizers Exhibiting Polarizing Energy Transfer

The PL materials and PL polarizers made thereof, according to the present invention, are characterized in that they comprise at least one species which can act as sensitizer and at least one species which can act as emitter. Additional species might also be present, for example, to further improve the PL properties or to provide, for example, desired mechanical properties or orientations. The PL polarizers which are subject of the present invention are characterized in a low degree of polarization in absorption and a high degree of polarization in emission. Preferably the dichroic ratio in absorption at the wavelength employed for excitation is less than 3.5; more preferably the dichroic ratio in absorption at the wavelength employed for excitation is less than 3; even more preferably the dichroic ratio in absorption at the wavelength employed for excitation is less than 2 most preferably the dichroic ratio in absorption at the wavelength employed for excitation is less than 1.5. Preferably the dichroic ratio in emission is more than 4; more preferably the dichroic ratio in emission is more than 10; most preferably the dichroic ratio in emission is more than 15. Preferably, the observed emission of the PL polarizers according to the present invention essentially origins from the emitter and preferably no or only little of the observed emission directly originates, that is without polarizing energy transfer, from the sensitizer. As it is well known from the state of the art, efficient energy transfer processes generally require a close proximity of the involved species; hence the PL materials and PL polarizers made thereof, according to the present invention, are characterized in that they comprise sensitizer and emitter in a fashion which enables an efficient polarizing energy transfer.

The PL polarizers which are subject of the present invention may be obtained in, or processed into, many useful forms, for example, but not limited to, a fiber, rod, film, sheet, layer, tape or plate, and the like which may be homogeneous and continuous, and may be structured or patterned, and may comprise multiple individual elements, zones or pixels, or arrays thereof.

The Sensitizer

The criteria for the selection of sensitizers that might be used in the present invention will become apparent to those skilled in the art by the guidelines and examples given below. To avoid any replication from the known prior art, all the below mentioned literature references related to appropriate species are herewith included in, and part of the present invention.

The sensitizer is a photoluminescent species, preferably of high quantum efficiency, the characteristics of which are appropriately related to those of the emitter. The sensitizer emission spectrum should (whether observed or not) significantly overlap with the emitter absorption band. The sensitizer should exhibit a significant optical absorption at the wavelength that is used for excitation of the PL polarizers according to the present invention. Preferably, the excitation wavelength is at or around the wavelength of an optical absorption band of the sensitizer. Preferably, the absorption spectrum of the sensitizer only minimally overlaps with the emission spectrum of the emitter. Importantly, besides enabling the desired polarizing energy transfer described heretofore, the sensitizer should not otherwise disadvantageously influence the luminescence properties of the emitter; for example by quenching its luminescence, forming undesired excimer complexes with the latter, etcetera.

Most importantly, the sensitizer must, directly or indirectly, alone or in combination with other species, give rise to an absorption which is characterized by a low degree of polarization when incorporated in PL polarizers according to the present invention. Preferred methods to produce such PL polarizers, including the ones explicitly claimed herein, typically comprise an orientation step as described in more detailed below. This orientation step should not lead to a significant polarization in the sensitizer's absorption. One preferred possibility to prevent the latter, is to hinder an undesired orientation of the sensitizer, for example by selecting sensitizers of low molecular form-anisotropy. Although molecular shape is not the sole determining factor, it is well known in the art that a low form-anisotropy often hampers efficient orientation, as disclosed by E. Thulstrup (J. Am. Chem. Soc., Vol. 104, p. 5594 (1982)).

We have found, as is evident from the examples given below, that, for example, the small molecular compounds 7-diethylamino-4-methylcoumarin, hereinafter designated as DMC, (7-[dimethylamino]-2,3-dihydrocyclopenta{c}{1}benzopyran-4[1H]one), hereinafter designated as C138, propyl-9-anthracenecarboxylate, hereinafter designated as PAC, 4-methyl-7-(octyloxy)2H-2-chromenone, hereinafter designated as MOC, as well as the compounds designated BPEB and BPO (all chemical structures given below) are particularly useful as sensitizers in preferred embodiments of the present invention:

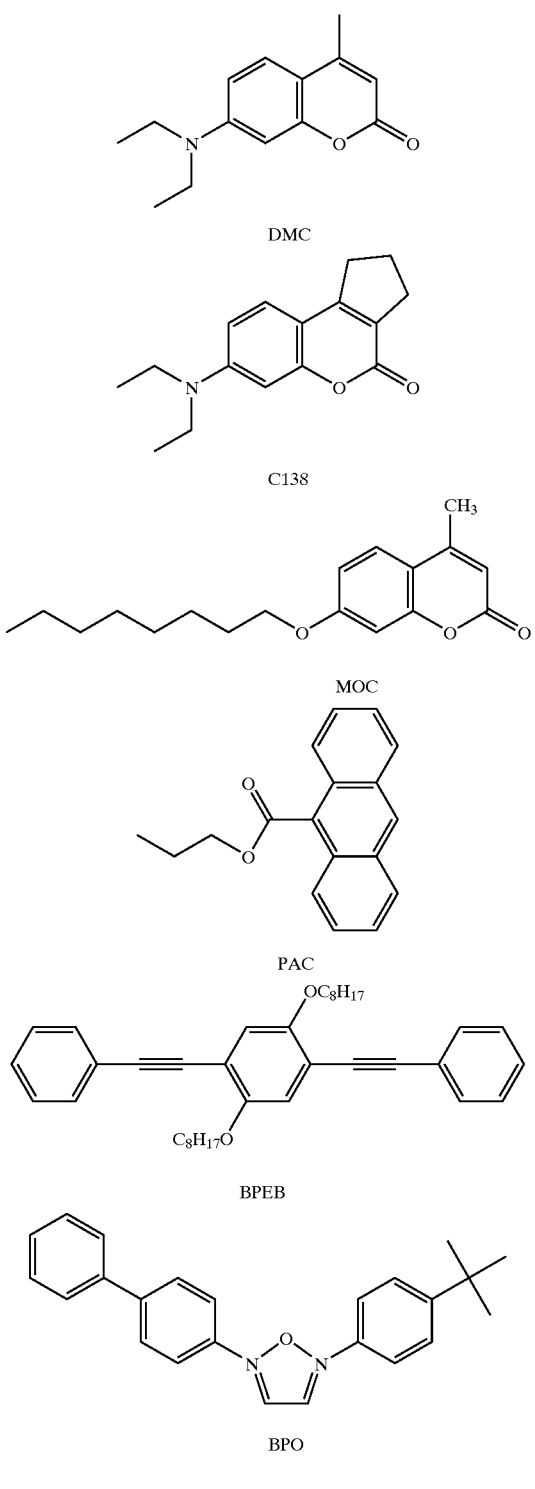

Other suitable, representative, organic molecules that can be useful as sensitizer in the present invention can be found in, for example, "Organic Luminescent Materials" by M. Krasovitskii et al. (VCH Publishers, Weinheim, (1988)); "Spectroscopy with polarized light" by J. Michl et al. (VCH Publishers, New York, (1986)); "Photophysics of aromatic, molecules" by J. B. Birks (Wiley, London, (1970)); representative examples include, but are not limited to:

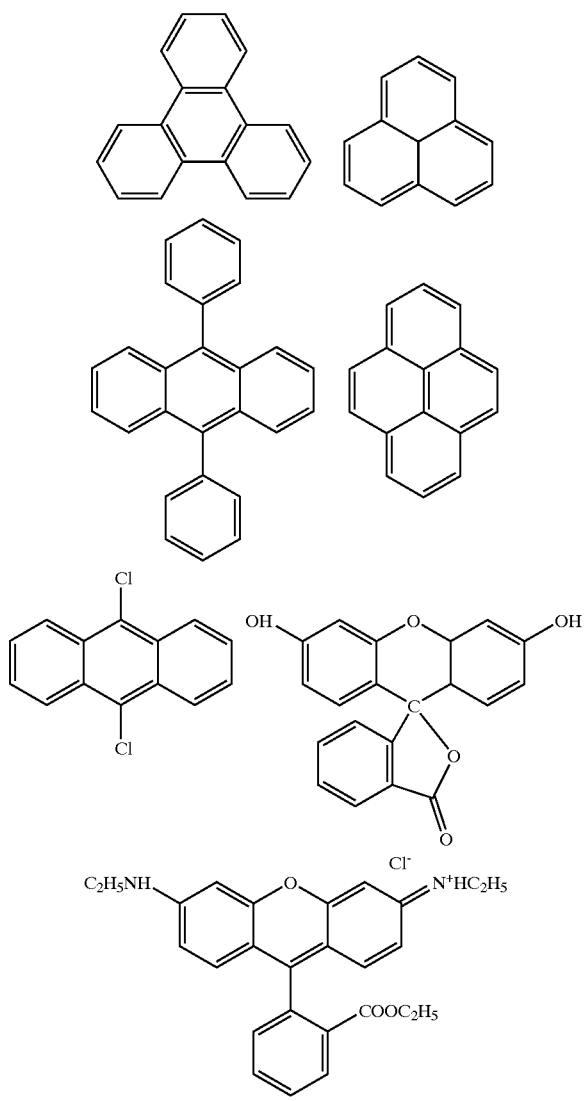

The sensitizer useful in the present invention also can be a luminescent oligomer or polymer, as disclosed in, for example, S. E. Webber, Chem. Rev., Vol. 90, pp. 1469–1482 (1990). Alternatively, the sensitizer useful in the present invention is an inorganic luminescent species, such as disclosed in, for example, "Luminescence of inorganic solids" by B. DiBartoldo et al. (Plenum Press, New York, (1978)) or "Luminescence of inorganic solids" by P. Goldberg et al. (Academic Press. New York, (1966)).

The Emitter

The criteria for the selection of emitters that might be used in the present invention will become apparent to those skilled in the art by the guidelines and examples given below. To avoid any replication from the known prior art, all the below mentioned literature references in relation to appropriate species are herewith included in, and part of the present invention.

The emitter is a photoluminescent species, preferably of high quantum efficiency, the characteristics of which are appropriately related to those of the sensitizer as pointed out above. The emitter should have an emission spectrum which is appropriate for the desired application.

Most importantly, the emitter, when incorporated in PL polarizers according to the present invention, must give rise to an emission which is characterized by a high degree of polarization. Preferred methods to produce such PL polarizers, including the ones explicitly claimed herein, typically comprise an orientation step as described more detailed below. This orientation step is employed to induce a significant uniaxial orientation of the emitter, which can result, as well known in the art, in a significant degree of polarization in emission. Although molecular shape is not the sole determining factor, it is well known in the art that a high form-anisotropy usually enables an efficient orientation, as disclosed by E. Thulstrup (J. Am. Chem. Soc., Vol. 104, p. 5594 (1982).

We have found, as is evident from the examples given below, that polymers, such as, for example, poly(2,5-dialkoxy-p-phenyleneethynylene) derivatives such as EHO-OPPE and O-PPE and poly(p-phenylenevinylene) derivatives such as (poly[2-methoxy-5-[2'-ethyl-hexyloxy]-p-phenylenevinylene] (MEH-PPV) are useful as emitter in preferred embodiments of the present invention:

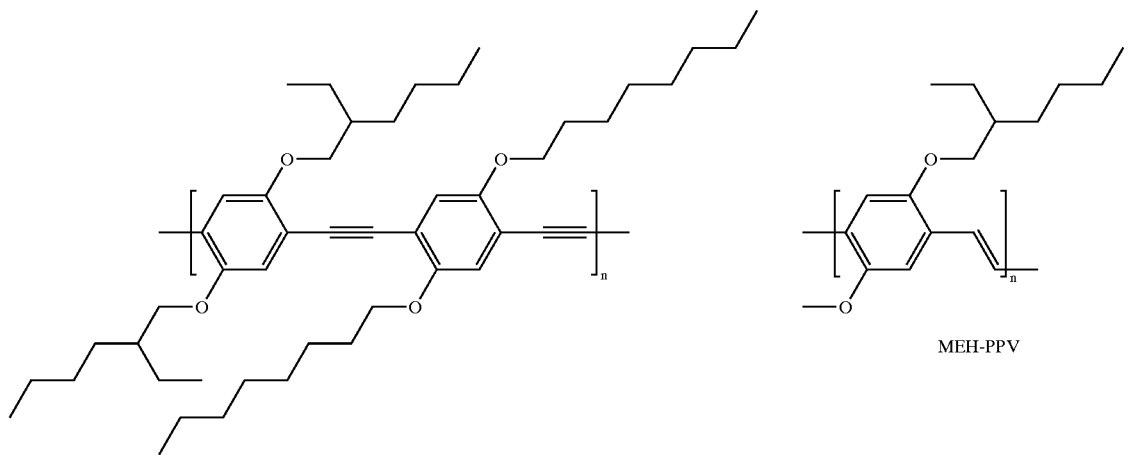

EHO-OPPE

MEH-PPV

O-OPPE

Other suitable, representative, species that can be useful as emitter in the present invention are organic species, such as small molecules, oligomers or polymers, or mixtures thereof or of organic and inorganic materials. Representative examples of small organic species and oligomers useful in the present invention can be found in, for example, "Organic Luminescent Materials" by M. Krasovitskii et al. (VCH Publishers, Weinheim, (1988)); "Spectroscopy with polarized light" by J. Michl et al. (VCH Publishers, New York, (1986)); "Photophysics of aromatic molecules" by J. B. Birks (Wiley, London, (1970)).

Oligomers and polymers that are useful as emitters in the present invention include, but are not limited to those molecules that comprise one or more of the following moieties:

where Ar is an arylene group including, but not limited to the following moieties:

and where $R-R_6$, are the same or different at each occurrence, and are composed of, for example, but not limited to: H, alkyl alkyloxy, $CF_3$, CN, phenyl, $NH_2$, NH-alkyl, $N(alkyl)_2$, $NO_2$ and $Si(alkyl)_3$.

Other suitable, representative, species that can be useful as emitter in the present invention are inorganic materials, such as GaInP-compounds (P. J. Pearah et al. Appl. Phys. Lett. Vol. 62, pp. 729–731), ZnSe (L. Worschech et al., "Blue Laser Light Emitting Diodes", Int. Symp., pp. 421–424, Eds. A Yoshikawa, Tokyo, Japan, 1996), or tris (bipyridine)ruthenium(2+) intercalated cadmiumthiohypophosphazene (E. Lifshitz et al., J. Phys. Chem. Solids, Vol. 52, pp. 1081–1086 (1991), or inorganic oligomers or polymers, or mixtures thereof.

Coupling of Sensitizer and Emitter

As noted heretofore, sensitizer and emitter can be different species, but they might also be combined in one. To combine sensitizer and emitter, the moieties may covalently be linked by adequate chemical, ionic or hydrogen bonds (which should not negatively influence the photophysical properties of sensitizer and emitter) and combined, for example, in one small molecule, oligomer or polymer. The combination in a polymer can, for example, be achieved by making a copolymer which comprises sensitizer and emitter moieties. Alternatively, either the sensitizer or the emitter species can be incorporated into a polymer backbone, while the other species is attached as a side-group. Other options are to attach both these moieties as side-groups to a polymer. Still other options include inorganic or organic/inorganic materials, for example salts or complexes, comprising both sensitizer and emitter moieties. We have found, as is evident from the examples given below, that, for example, the copolymer designated ANT-OPPE (chemical structure given below) is particularly useful as multifunctional material (which combines sensitizer and emitter moieties) in preferred embodiments of the present invention:

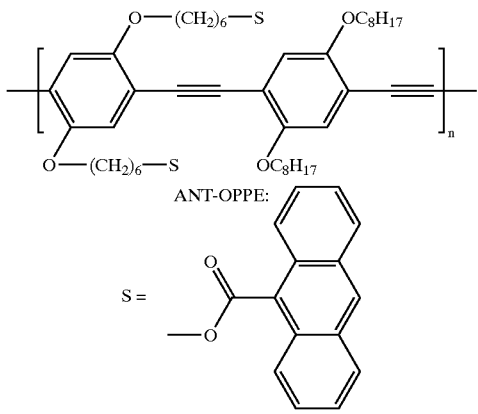

Methods for the Preparation of PL Materials and PL Polarizers Thereof

The criteria for the selection of methods which might be suitable for the fabrication of PL materials and PL polarizers according to the present invention will become apparent to those skilled in the art by the guidelines and examples given below. To avoid any replication from the known prior art, all the below mentioned literature references in relation to appropriate methods are herewith included in, and part of the present invention.

PL materials and PL polarizers thereof, according to the present invention can be produced by the anisotropic distortion of mixtures or blends comprising at least one species that can act as sensitizer and at least one species that can act as the emitter. More specifically, we have found that a particularly beneficial method for the fabrication of PL materials and PL polarizers thereof, as claimed in the present invention, is the anisotropic distortion of ductile blends comprising form-isotropic sensitizer, form-anisotropic emitter and optionally a carrier polymer. A first method according to the present invention in essence involves three steps: (a) the dissolution of appropriate sensitizer, emitter and, optionally, a carrier polymer in a suitable solvent; (b) the preparation of a body having a first shape from the above solution by forming and removing the solvent and (c) the anisotropic distortion of the shaped article, for example through tensile deformation or like process to orient the emitter. This process not only leads to mechanically coherent PL polarizers, but also allows the production of PL polarizers in which an adequately chosen sensitizer is essentially randomly oriented, an adequately chosen emitter is highly oriented and the polarizing energy transfer, as reported heretofore, can be achieved.

A second method according to the present invention in essence involves three steps: (a) the melt-mixing of appropriate sensitizer, emitter and optionally a carrier polymer; (b) the preparation of a body having a first shape from the above mixture and (c) the anisotropic distortion of the shaped article through tensile deformation or like process to orient the emitter. This process not only leads to mechanically coherent PL polarizers, but also allows the production of PL polarizers in which an adequately chosen sensitizer is essentially randomly oriented, an adequately chosen emitter is highly oriented and the polarizing energy transfer, as reported heretofore, can be achieved.

Other methods which might also be suitable for the fabrication of PL materials and PL polarizers according to the present invention include, for example, but not limited to, the incorporation of appropriate sensitizers and emitters in oriented carrier polymers, after the orientation step, for example by diffusion, or the tensile orientation of mixtures of sensitizer and emitter without an additional carrier polymer, if either sensitizer or emitter or both is a ductile polymer.

Alternatively, PL materials and PL polarizers according to the present invention can be fabricated by oriented growth of mixtures comprising sensitizer and emitter onto orienting substrates, such as, for example, oriented poly (tetrafluoroethylene), polyimides or inorganic surfaces, in analogy to the methods described before (U.S. Pat. No. 5,180,470; K. Pichler et al., Synth. Met., Vol. 55–57, pp. 454–459 (1993); D. Fenwick et al., J. Mater. Sci., Vol. 31, pp. 915–920 (1996); R. Gill, et al., Adv. Mater., Vol. 9, pp. 331–334 (1997); G. Lüssem et al., Liq. Cryst., Vol. 21, pp. 903–907 (1996); P. J. Pearah et al., Appl. Phys. Lett. Vol. 62, pp. 729–731 (1993)).

Direct deposition through friction of mixtures comprising sensitizer and emitter, in analogy to the methods described before (N. Tanigaki et al., Thin Solid Films, Vol. 273, pp. 263–266 (1996) or rubbing of mixtures comprising sensitizer and emitter, or the Langmuir-Blodgett technique (V. Cimrová et al., Adv. Mater. Vol. 8. pp. 146–149 (1996); A. Bolognesi et al., Adv. Mater., Vol. 9, pp. 121–124 (1997); M. Hamaguchi et al., Appl. Phys. Lett., Vol. 67, pp. 3381 (1995)) may also be employed for the fabrication of the PL materials and PL polarizers claimed in the present invention. Other techniques, such as photo-induced alignment, alignment in electric, magnetic or flow fields of mixtures comprising sensitizer and emitter may also be employed.

Other PL Materials and PL Polarizers Thereof Displaying the Novel Phenomenon of Polarizing Energy Transfer The above explanations should not be construed as limiting the spirit or scope of the invention, with respect to the properties of PL polarizers which are achieved by making and using materials that display the novel phenomenon of polarizing energy transfer. For example, the invention is not limited to PL polarizers that emit linearly polarized light, but the concepts outlined heretofore can also yield PL polarizers, which are, according to the present invention, characterized in highly elliptically or circularly polarized emission and in a low degree of polarization in their absorption. Thus, the phenomenon of polarizing energy transfer, for example, also can occur in materials which comprise an appropriate, usually essentially randomly oriented first photoluminescent species which gives rise to an essentially isotropic absorption, and a usually chiral second photoluminescent species which is also comprised in the material, and subsequently can emit highly circularly polarized light. Alternatively, the new polarization-sensitive energy transfer concepts disclosed in this invention can be employed in reversed fashion, therewith creating materials that exhibit a depolarizing energy transfer. An example are materials which comprise an appropriate, oriented first photoluminescent species which gives rise to an essentially anisotropic absorption, and a usually essentially randomly oriented second photoluminescent species which gives rise to an essentially isotropic emission.

PL Display Devices

As stated heretofore, the PL polarizers claimed in the present invention and characterized in a low degree of polarization in their absorption and a high degree of polarization in their emission can be used to produce improved display devices, which are also part of the present invention. Some of the relevant basic principles of the display devices according to the present invention and illustrative examples are presented hereafter.

In FIG. 1A, an exploded schematic view of a possible device configuration is given. The arrangement, when viewed from the position of the viewer (5) consists of a linear polarizer (analyzer) (4), an electrooptical light valve (3), the PL Polarizer (2) and a light source (1). Light emerging from the light-source (1) is at least partially absorbed in the PL polarizer (2), from where subsequently polarized light is emitted. The portion of the light emitted from the PL polarizer (2) in the direction of the electrooptical light valve (3) either passes the combination of light valve (3) and the polarizer (4) (switching state "bright ") or is blocked by the combination of light valve (3) and the polarizer (4) (switching state "dark"). It should be noted that the switching states "bright" and "dark" not necessarily coincide with above referred electric switching states "on" and "off", respectively, and the correlation also depends on the precise device configuration. The polarizer (4) is oriented such that it allows transmission of the light emitted by the PL polarizer (2) in its polarization direction when the switching state of the light valve (3) is "bright". According to the present invention, maximum contrast is obtained when (i) the PL polarizer (2) is characterized by a high dichroic ratio for PL emission, and (ii) the portion of light visible to the human eye that is emitted by the light source (1), but not absorbed by the PL polarizer (2), and thus exits the device in the direction of the viewer, is minimal. This can be achieved by different means. One example comprises a light source (1) which is characterized by an emission spectrum such that all the light emitted by the light source is absorbed by preferably the PL polarizer (2) or alternatively the light valve (3) or the polarizer (4). The use of a UV-light source can be particular advantageous in this context, since the portion of light that is emitted by the light source (1), but not absorbed by the PL polarizer (2), is in this case usually absorbed by components (2), (3), or (4).

Figure 1B:
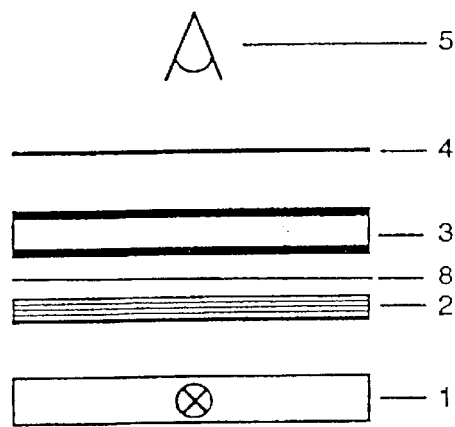

An alternative example of a possible display device according to the present invention is shown in FIG. 1B in an exploded schematic view. Here, an additional means (8) (for clarity called "cut-off-filter"), which blocks the light that is emitted by the light source (1) but is not absorbed by the PL polarizer (2), is positioned in the device between the PL polarizer (2) and the viewer (5), preferably between the PL polarizer (2) and the light valve (3). This cut-off-filter (8) can be, for example, a polarizer or a high-pass filter or a wavelength-selective mirror (which reflects the light generated by the lamp that was not absorbed by the PL polarizer, but transmits the light emitted by the PL polarizer) or a combination thereof. Another possible arrangement is the use of a combination layer of the PL polarizer (2) and the cut-off-filter (8), for example, by doping or coating the PL polarizer (2) with an additional dye.

Figure 1C:
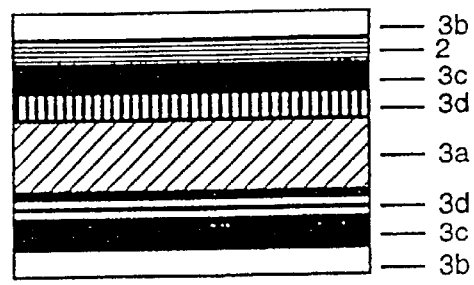

The display device can also be arranged, such that the PL polarizer (2) is placed inside the electrooptical light valve (3), such as shown in an exploded schematic view in FIG. 1C. In order to keep the switching voltages low, the PL polarizer (2) is positioned between the transparent electrode (3c) and carrier plate (3b). Particular advantages of this arrangement are a more compact device and an enhanced viewing angle, as well as the absence of parallax in a pixellated structure. In addition, the PL polarizer (2) according to the present invention, may function also as orientation layer (3d in FIG. 1C) for the liquid crystalline material.

For the above given configuration (except display devices comprising the PL polarizer (2) inside the electrooptical light valve (3) as shown in FIG. 1C, arranged such that light emerging from the light source first passes the liquid crystal layer (3a) before exciting the PL polarizer (2)), the liquid crystal cell is optimized to switch light of the wavelength of the light that is emitted by the PL polarizer. The transmission is controlled by the axes of the PL polarizer and the polarizer film, the switching state of the device field-off or -on state, the wavelength of the emitted light, the cell thickness and the optical properties of the LC material. For some LC effects the set of parameters are given below:

ECB effect: When the polar axis of the polarizer and the PL polarizer axis are crossed and the liquid crystal orientation is at 45° with these axes, the maximum transmission ("bright" state) in the field-off state depends on the thickness of the cell d, the birefringence of the liquid crystal Δn and the wavelength λ and occurs at $$\frac{d\Delta n}{\lambda} = \frac{k}{2} \quad \text{with } k = 1, 3, 5, 7, \ldots$$

In that case, the polarized light transmitted by the LC layer remains linearly polarized, but the polarization axes is rotated over 90°. In a preferred cell configuration k is 1, which, optimized for a wavelength of 510 nm (green) and a commercial LC material Licrilite ML1001 (Merck Ltd.) with a Δn=0.122 at the same wavelength, means that the optimum cell thickness is 2.1 μm.

When an electrical field is applied, the effective Δn becomes smaller and the transmitted light becomes elliptically polarized. The polarizer film will now absorb part of the light, an effect that may be applied to generate intermediate tones. In the fully addressed state, where all LC molecules are aligned along the electrical field lines, dΔn/λ becomes 0 and the light is fully extinguished by the polarizer ("dark" state).

In another possible configuration, the axes of the polarizer and the PL polarizer are chosen to be parallel, by which a dark field-off state and a bright and colored field-on state is obtained. In again another configuration the LC molecules have a negative dielectric anisotropy and are aligned perpendicular to the electrode surface by a surfactant type of alignment layer (e.g. lecithin). In the field-off state the LC film has a low birefringence for the passing light and a dark state is formed in case of crossed axes of the PL polarizer and the polarizer film, respectively. When the field is switched on, the LC film becomes birefringent above the transition voltage, and the polarizer transmits the by the PL polarizer emitted light.

TN effect: In the case that a multi-color display is made, containing pixel elements with basically three different PL polarizers emitting blue, green and red light (see below), the TN effect is preferred because of its high contrast and its relative wavelength independence. This enables effective switching of the three colors with one uniform cell thickness. The relative intensity ($I_t$) of the light transmitted by the TN with the axes of the PL polarizer and the polarizer film parallel and the orientation at one boundary of the LC film parallel with the axis of the PL polarizer is described by $$I_t = \frac{\sin^2[\frac{\pi}{2}]\sqrt{1+\left(\frac{2d\Delta n}{\lambda}\right)^2}}{1+\left(\frac{2d\Delta n}{\lambda}\right)^2}$$

Figure 2:
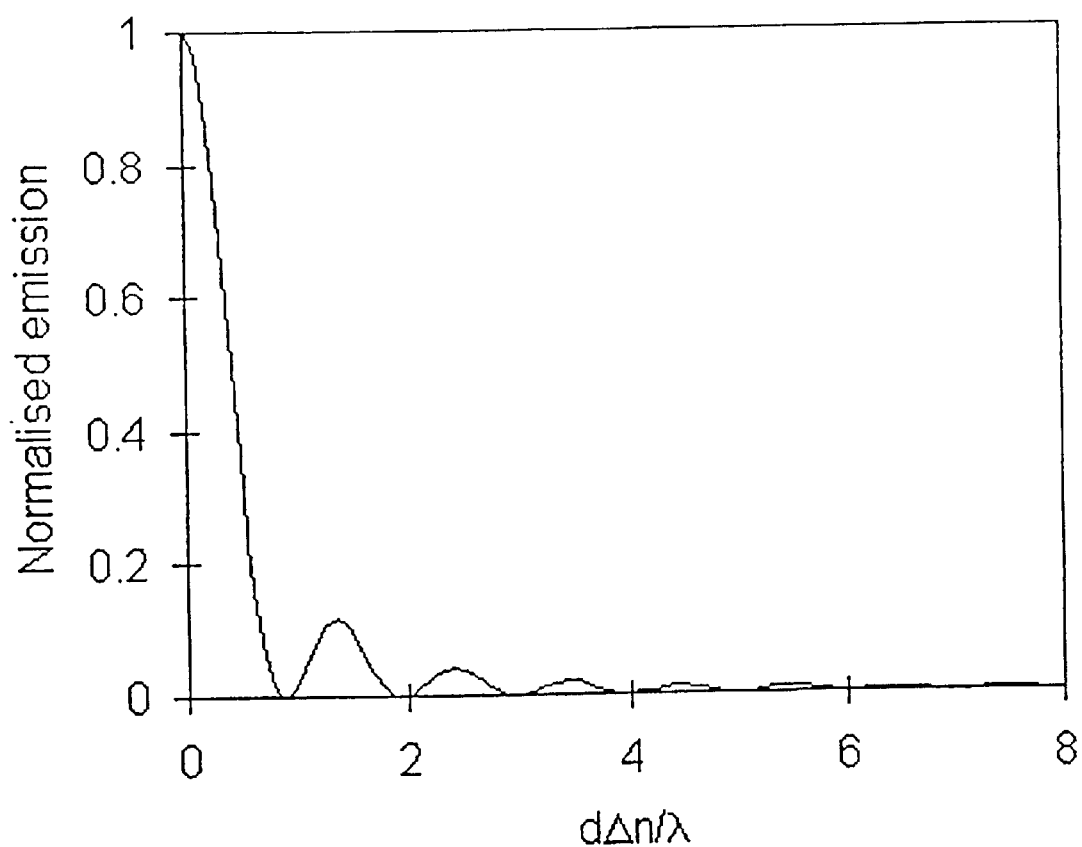
FIG. 2 is a plot of normalized emission versus the product of the thickness (d) and birefringence ($\Delta n$) divided by the wavelength ($\lambda$).

When $I_t$ is plotted versus $d\Delta n/\lambda$, in which $\Delta n$ is wavelength dependent because of the refractive index dispersion, this yields the curve drawn in FIG. 2.

For example, the unaddressed state the parameters of the TN cell are chosen such that on the average for the wavelengths of interest $d\Delta n/\lambda$ are close to the first minimum. i.e. $d\Delta n/\lambda=1/2\sqrt{3}$. In this TN cell configuration, optimized for a wavelength of 510 nm (green) and a commercial LC material Licrilite ML1001 (Merck Ltd.) with a $\Delta n=0.122$ at the same wavelength, the optimum cell thickness is 3.6 $\mu$m. This means that the cell is perfectly black in the field-off state for 510 nm light and that it has a normalized emission of 0.08 for 440 nm light (blue) and of 0.06 for 620 nm light (red). Both values are sufficiently low to give the display a black appearance for all three colors.

Also in the TN display the axes of the PL polarizer and the polarizer film can be chosen perpendicular. In that the inverted curve in FIG. 2 is obtained with a "bright" state, i.e. an emissive colored state for each pixel element and a white state for the integrated performance of a collection of neighbouring pixels, in the field-off state and a black appearance in the field-on state.

Figure 1D:
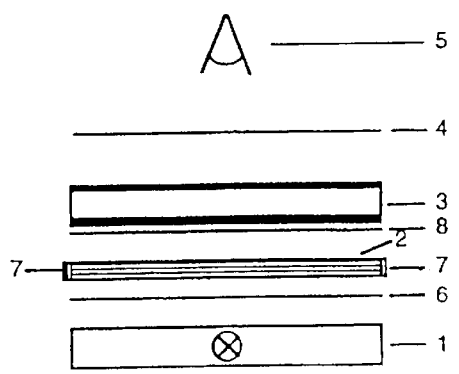

For many possible devices structures, including the examples given in FIGS. 1A, 1B and 1C the use of a dichroic mirror (6), which is positioned between the PL polarizer (2) and the light source (1), may sometimes be advantageous (FIG. 1D for an exploded schematic view). This dichroic mirror (6) is characterized in that it lets the light emitted by the light source (1) pass and reach the PL polarizer (2), but reflects the portion of light which initially is emitted by the PL polarizer (2) in a direction away from the viewer (5) and, thus, the dichroic mirror (6) redirects this portion of light in the direction towards the viewer (5). The PL polarizer (2) might, in addition, be mirrored (7) in order to prevent the exit of light in undesired directions and might be provided with light emergent or exit windows such as described in German patent No. DE 2640909 C2, to further concentrate the emission of light to preferred sites, and thus increase the device efficiency with respect to contrast and brightness.

Figure 1E:
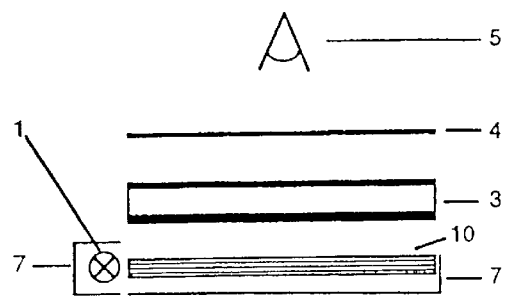

Another example for a possible device structure is given in an exploded schematic view FIG. 1E. Here, the PL polarizer functions as a polarizing photoluminescence waveguide (10), in which the light emitted by the light source (1) is waveguided until it is absorbed and re-emitted by the photoluminescent species. The device is preferably fitted with a dichroic mirror (6) as outlined above, and with mirrors (7) and light emergent or exit windows as outlined above.

Figure 1F:
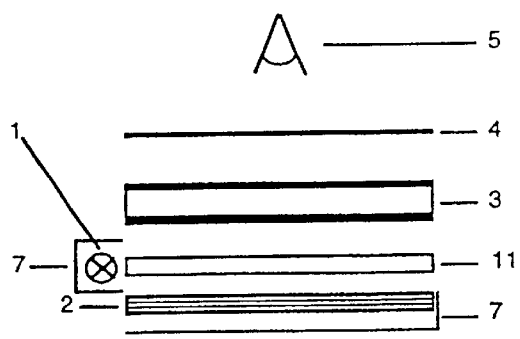

Alternatively, a conventional waveguide-based backlight system is used (cf. FIG. 1F) in which the PL polarizer (2) is arranged such that it is behind the waveguide (11) when viewed from the direction of the viewer (5). Preferably, the waveguide (11) is characterized in that it emits the light guided from the light source (1) preferably into the direction of the PL polarizer (2), and that it allows the transmittance of the polarized light emitted from the PL polarizer (2). The PL polarizer (2) in the display device according to FIG. 1F may additionally function as a polarized scatterer or diffuser.

Figure 1G:
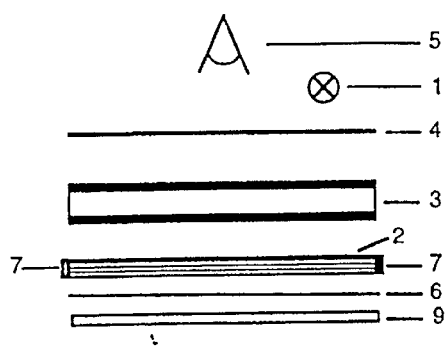

Yet another example of a possible device structure is given in an exploded schematic view FIG. 1G. Here, ambient light (1) is used for illumination, entering the device in a direction from the viewer to the device, with the PL polarizer (2) being void of mirrors on its two large faces (oriented towards the viewer and away from the viewer), but preferably mirrored (7) at all other sides. Behind the PL polarizer (2) (viewed from the direction of the viewer), preferably a dichroic mirror (6) is used, which only reflects the polarized light emitted by the PL polarizer (2). The ambient light which is not absorbed by the PL polarizer (2), is absorbed in a nonreflective layer (9).

Embodiments of possible display devices that comprise other electrooptical light valves, such as those based on, for example, super-twisted nematics, in-plane nematic and ferroelectrics, or combinations thereof, are also included in the present invention.

Embodiments of possible display devices that comprise other polarizers than the linear polarizer (analyzer) (4), such as scattering polarizers or reflective polarizers or the prior art PL polarizers that are characterized in a high degree of polarization in their absorption, are also included in the present invention. In possible devices which comprise the latter, it is envisaged that light that is emitted from one PL polarizer can be used for the excitation of another PL polarizer leading to additional improvements and enhanced device characteristics.

It is envisaged that the display devices according to the present invention may optionally include one or more additional layers or elements including, but not limited to diffusers, color filters, scatterers, and/or prismated films.

In order to maximally benefit from the advantages set forth in the description of the present invention, the elements constituting the display devices should have photophysical characteristics, such as transmission, absorption and refractive index that are optimized with respect to the emission wavelength and other optical characteristics of the polarized PL layers of the present invention, and also the light source, according to the principles well known to those skilled in the art of display device design and manufacturing.

The following examples are set forth to further illustrate the present invention and should not be construed as limiting the spirit or scope of the invention.

Example A

Outside the Invention

Preparation of Emitters

Polymers designated, respectively, EHO-OPPE, a poly(p-phenyleneethynylene) derivatized with linear and sterically hindered alkyloxy groups in an alternating pattern, O-OPPE, a poly(p-phenyleneethynylene) derivatized with only linear alkyloxy groups, and MEH-PPV (poly[1-methoxy-4-ethyl-hexyloxy-2,5-phenylenevinylene]), the chemical structures of which have been given heretofore, were synthesized according to the procedures described by Ch. Weder et al. (Macromolecules, (1996) Vol. 29, p. 5157), D. Steiger et al. (Macromol. Rapid Commun., (1997) Vol. 18, p. 643) and in U.S. Pat. No. 5,204,038. Two different EHO-OPPE samples with number-average molecular weights, $M_n$, of 10,000 gmol$^{-1}$ and 84,000 gmol$^{-1}$ (HMW-EHO-OPPE), respectively, were used, O-OPPE had a number-average molecular weight, $M_n$, of 10,000 gmol$^{-1}$, and MEH-PPV was of a weight-average molecular weight, $M_w$, of about 450,000 gmol$^{-1}$.

Sensitizers Used

Sensitizers designated, respectively, DMC (7-diethylamino-4-methylcoumarin), C138, (Coumarin 138), and BPO, the chemical structures of which have been given heretofore, were obtained from Aldrich Co.

1,4-Bis(phenylethynyl)-2,5-dioctyloxybenzene (BPEB), the chemical structure of which has been given heretofore, was synthesized according to the following procedure: Phenylacetylene (0.155 g, 1.52 mmol), 1,4-dioctyloxy-2,5-diiodobenzene (0.434 g, 0.740 mmol, prepared according to the procedures described by Ch. Weder et al. (Macromolecules, (1996) Vol. 29, p. 5157)), Pd(PPh$_3$)$_4$ (0.0425 g, 0.0368 mmol), and CuI (0.0070 g. 0.037 mmol) were combined in a degassed mixture of absolute toluene (15 mL) and diisopropylamine (7 mL). The reaction mixture was then stirred at 70° C. under a dry Ar atmosphere for 18 h. After the reaction mixture was cooled to room temperature, it was passed through a 4 cm plug of silica gel using toluene as eluent. The evaporation of the solvent led to an orange oil which crystallized upon standing. Recrystallization from ethanol (twice) yielded yellow crystals (0.247 g, 62%): mp 75° C. 4-Methyl-7-(octyloxy)-2H-2-chromenone (MOC), the chemical structure of which has been given heretofore, was synthesized according to the following procedure: To a stirred solution of octanol (370 mg, 2.83 mmol), 7-hydroxy-4-methyl-coumarin (500 mg, 2.83 mmol) and PPh$_3$ (1.11 g, 4.25 mmol) in dry THF (20 mL), a solution of diethylazodicarboxylate (740 mg, 4.25 mmol) in dry THF (5 mL) was slowly added. The solution was stirred under argon atmosphere for 18 h at ambient temperature. The precipitate was filtered off and the filtrate was evaporated in vacuo. The resulting oil was purified using column chromatography (SiO$_2$: eluent: CH$_2$Cl$_2$/hexane 1/1, R$_f$=0.15) and yielded a colorless oil (0.66 g, 77%) that slowly solidified upon standing.

Propyl 9-anthracenecarboxylate (PAC), the chemical structure of which has been given heretofore, was synthesized according to a procedure described by K. Salt et al. (J. Phys. Chem. (1994) Vol. 98, p. 9986). Recrystallization from MeOH afforded light yellow crystals (0.75 gr, 62%). M.p.= 75° C. (lit. 68–69° C.).

Multifunctional Copolymers Used

The multifunctional copolymer designated ANT-OPPE, the chemical structure of which has been given heretofore and which combines sensitizer and emitter moieties in the same polymer, was synthesized according to the following procedures:

6-{4-[(6-Hydroxyhexyl)oxy]-2,5-diiodophenoxy}-1-hexanol (DDHB): To a stirred suspension under argon atmosphere of K$_2$CO$_3$ (7 g) in dry DMF (22 mL), 1,4-dihydroxy-2,5-diiodobenzene (2 g, 5.52 mmol) in dry DMF (15 mL) was added. After stirring for 15 min, 1-bromohexanol (3 mL) was added dropwise. The mixture was stirred at 75° C. for 3 d and then poured into ice water (300 mL). The aqeous layer was extracted with diethyl ether (3×200 mL) and the combined organic layers were washed with diluted HCl, water, and saturated NaCl solution. The organic layers were dried with MgSO$_4$, filtered and evaporated in vacuo. The crude compound was purified with column chromatography (SiO$_2$: eluent: CH$_2$Cl$_2$/CH$_3$CN 4/1; R$_f$=0.18). The resulting oil was dissolved in CH$_2$Cl$_2$ (10 mL): hexane (10 mL) was added and the solution was refrigerated overnight. Pure DDHB was then obtained as a white powder (1.21 g, 39%). M.p.=83° C.

6-[4-({6-[(9-anthrylcarbonyl)oxy]hexyl}oxy-2,5-diiodophenoxy]hexyl 9-anthracenecarboxylate (M$_{ANT}$): 9-Anthracenecarboxylic acid (250 mg, 1.12 mmol) was suspended in dry CH$_2$Cl$_2$ (5 mL). Trifluoroacetic anhydride (0.7 mL) was added slowly via a syringe and the suspension slowly turned into a yellow solution. After stirring for 15 min, a solution of DDHB (300 mg, 0.53 mmol) in CH$_2$Cl$_2$ (9 mL) was slowly added. The solution was stirred overnight at ambient temperature. After evaporation of the solvent, the resulting yellow oil was purified using a filtration over SiO$_2$ (eluent: CH$_2$Cl$_2$). Recrystallization from toluene/heptane 1/1 afforded cream colored crystals (365 mg, 70%). M.p.= 148.7° C.

ANT-OPPE: 1,4-Dioctyloxy-2,5-diiodobenzene (87.5 mg, 0.228 mmol, prepared according to the procedures described by Ch. Weder et al. (Macromolecules, (1996) Vol. 29, p. 5157)), M$_{ANT}$ (192 mg, 0.197 mmol), iodobenzene (14 mg, 0.067 mmol), Pd(PPh$_3$)$_4$ (28 mg), and CuI (20 mg) were added to a mixture of toluene (8 mL) and diisopropylamine (3 mL). The mixture was stirred at 75° C. for 18 h. Then, an additional amount of iodobenzene (0.05 mL) was added and the suspension was stirred for another 2 h. The resulting strongly luminescent suspension was precipitated into MeOH (300 mL) and the yellow precipitate was filtered over a glass filter. The solid precipitate was dissolved in CHCl$_3$ (4 mL) and reprecipitated into MeOH (300 mL). The yellow solids were thoroughly washed with MeOH and dried in vacuo (130 mg, 60%). T$_g$=44.8° C. M$_n$ of this material was of the order of 14,300 gmol$^{-1}$.

Carrier Polymers Used

Ultra-high molecular weight polyethylene (UHMW-PE, Hostalen Gur 412, weight-average molecular weight ~4·10$^6$ gmol$^{-1}$, Hoechst AG) and high molecular weight polyethylene (HDPE, Hostalen G. R. 7255p, weight-average molecular weight ~4·10$^5$ gmol$^{-1}$, Hoechst AG) respectively, were used as carrier polymers.

Solvent Used

Xylene (puriss. p.a., Fluka AG) was used as solvent.

Characterization of PL Materials and PL Polarizers

The anisotropic photophysical behavior of the PL polarizers according to this invention, as well as of reference materials and polarizers thereof which are outside the invention, were analyzed with polarized PL and polarized UV/Vis absorption spectroscopy. For photophysical experiments, as well as the production of devices, the PL polarizers were sandwiched between two quartz slides and a small amount of silicon oil was applied in order to minimize light scattering at the PL polarizer surfaces. Dichroic ratios were measured as defined above.

PL spectra were recorded on a SPEX Fluorolog 2 (Model F212 I) and a SPEX Fluorolog 3. Depending on the experiment, either polarized or unpolarized light was used for excitation; a Glan-Thomson polarizer was always employed on the detector side.

UV/Vis absorption spectra were recorded on a Perkin Elmer Lambda 900 instrument, fitted with motor driven Glan-Thomson polarizers. Scattering effects were compensated in the absorption measurements by subtracting the spectra of reference films essentially comprising the carrier polymers UHMW-PE or HDPE, respectively, of comparable draw ratio and thickness.

Example B

Outside the Invention

PL Polarizer Comprising Only Emitter and Carrier Polymer

PL materials comprising 1 or 2% w/w EHO-OPPE of a $M_n$ of 10,000 gmol$^{-1}$ as the emitter and UHMW-PE as a carrier polymer were prepared according to prior art (Ch. Weder e t al., Adv. Mat., Vol. 9, pp.1035–1039 (1997)) by casting a solution of the emitter (5 or 10 mg) and UHMW-PE (0.5 g) in xylene (50 g) (dissolution at 130° C. after degassing the mixture in vacuum at 25° C. for 15 min.) into a petri-dish of 11 cm in diameter. The resulting gels were dried under ambient conditions for 24 h to yield unoriented blend films which had a homogeneous thickness of about 70 μm. These films were drawn at temperatures of 90–120° C. on a thermostatically controlled hot shoe to a series of different draw-ratios (λ=final length/initial length) that ranged from 10 to 80. Draw ratios were calculated from the displacement of distance marks printed on the films prior to drawing. The oriented PL films or PL polarizers thus obtained had a thickness in the range from about 1 to about 10 μm.

This experiment was repeated with, alternatively, EHO-OPPE of a $M_n$ of 84,000 gmol$^{-1}$, O-OPPE of a $M_n$ Of 10,000 gmol$^{-1}$, and MEH-PPV of a $M_w$ of 450,000 gmol$^{-1}$ as the emitter.

Figure 3:
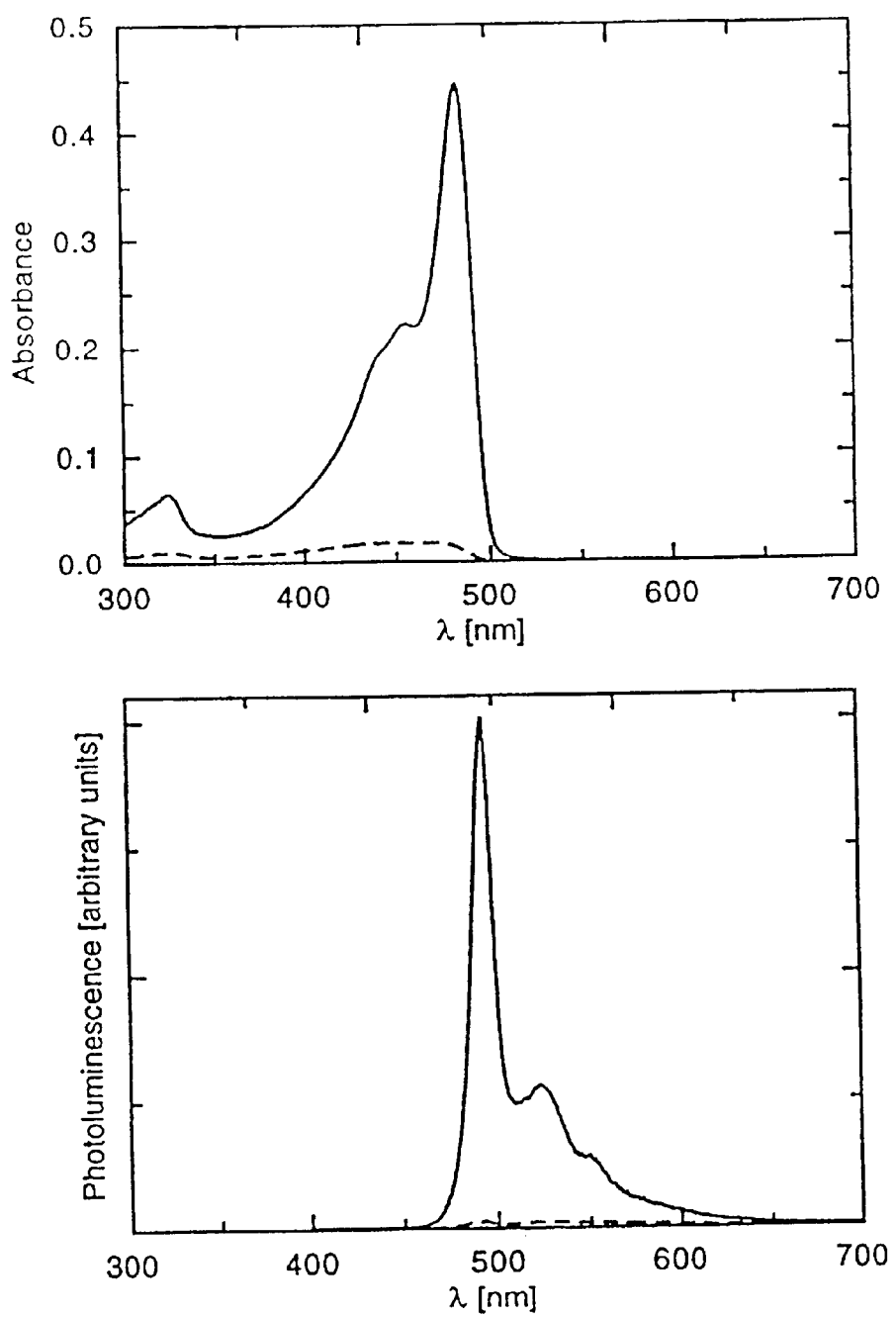
FIG. 3 displays the dichroic properties of a PL polarizer of 2% w/w of EHO-OPPE/UHMW-PE with a draw ratio of 80 (PL polarizer A). Top: polarized absorption spectra recorded for incident light polarized parallel (solid line) and perpendicular (dashed line) to the PL polarizer axis. Bottom: polarized PL emission spectra measured under isotropic excitation at 365 nm, through a linear polarizer (analyzer) with its polar axis parallel (solid line) and perpendicular (dashed line) to the PL polarizer axis, using unpolarized excitation light.
Figure 4:
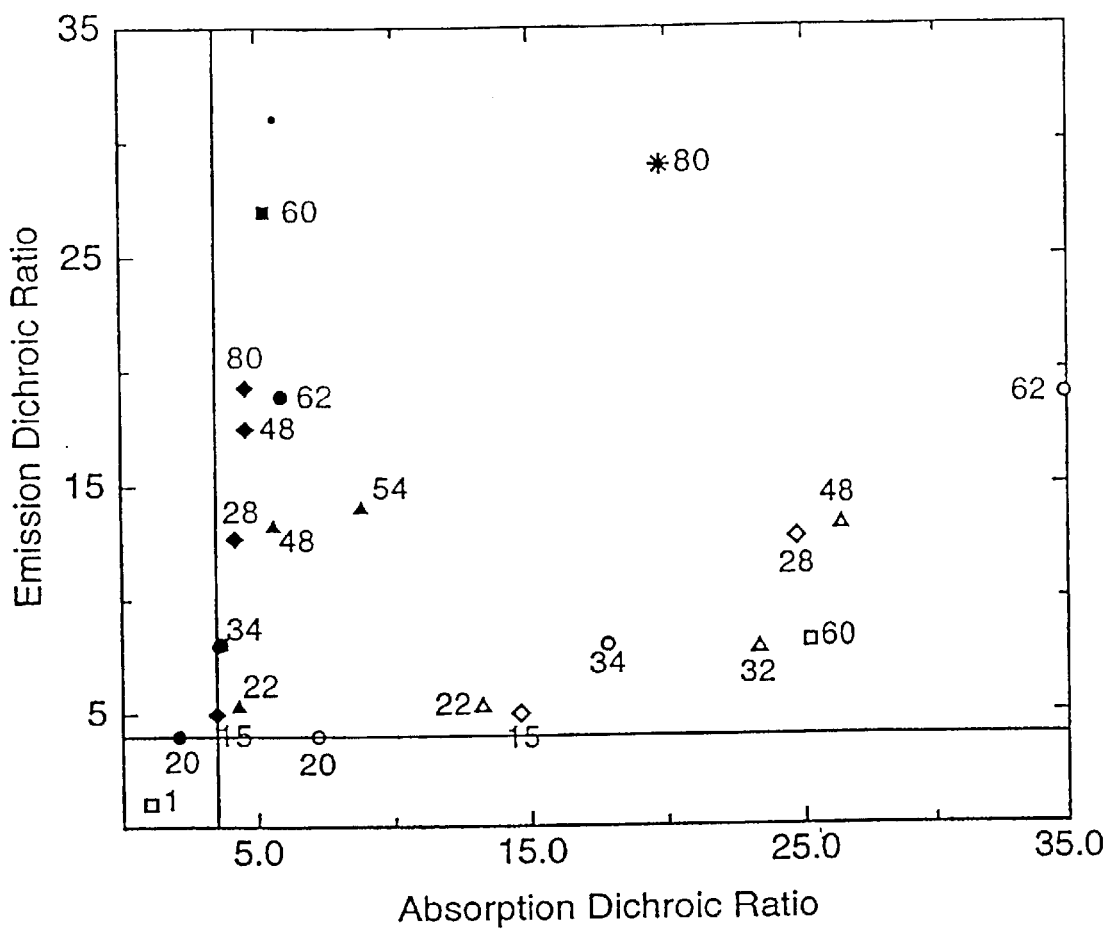
FIG. 4 is a plot of emission dichroic ratio versus absorption dichroic ratio for various prior art PL polarizers, as a function of draw ratio (given in the graph), composition, chemical structure of the emitter, and the excitation wavelength.

Highly polarized absorption and emission were observed for the highly oriented PL polarizers prepared in this example, as visualized in FIG. 3 for a PL polarizer comprising 2% w/w of EHO-OPPE with a draw ratio of 80. This particular PL polarizer (in the below examples referred to as PL polarizer A) was characterized by an emission dichroic ratio of 27 and an absorption dichroic ratio of 57 when measured at an excitation wavelength of 485 nm, that is, at the maximum of the EHO-OPPE main absorption band; when measured at 325 nm (where EHO-OPPE has another, but less intense, local absorption maximum) the absorption dichroic ratio drops to a still significant 5.3, with unchanged emission dichroic ratio. The influence of the draw ratio, the structure of the emitter, the composition of the blends, and the excitation wavelength (which was always selected to be at a local absorption maximum of the PL polarizer) on the dichroic properties of the PL polarizers prepared in this example are summarized in FIG. 4.

This experiment clearly demonstrates that the prior art method employed in this example, which yields PL polarizers containing only formanisotropic, conjugated polymers as emitter and a carrier polymer, does not yield PL polarizers that are characterized in, simultaneously, a low degree of polarization in absorption and a high degree of polarization in emission.

Example C

Outside the Invention

PL Films Comprising Only Sensitizer and Carrier Polymer

Example B was repeated, but instead of the emitter, the sensitizers DMC and C138, respectively, were incorporated into the PL film.

Figure 5:
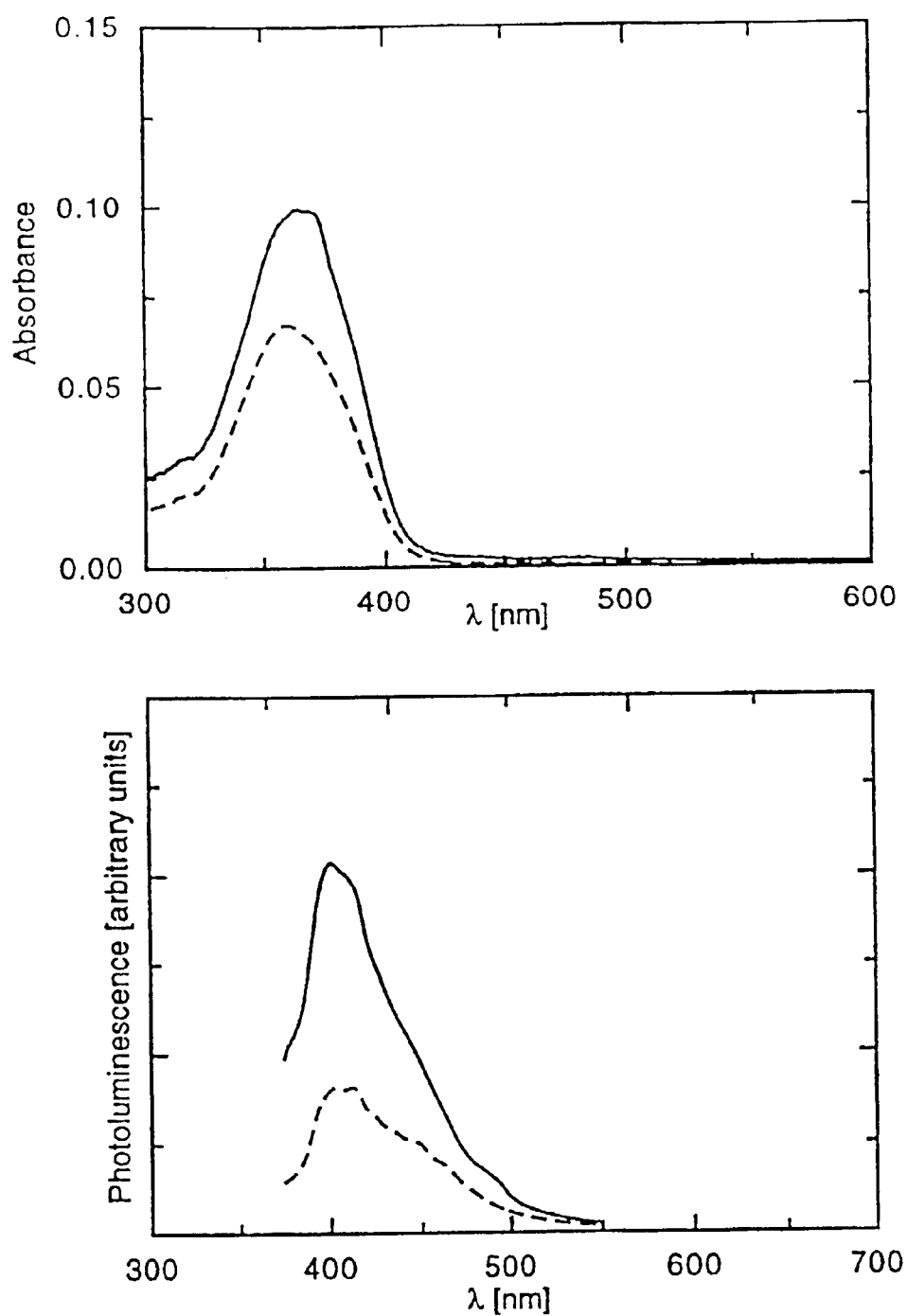
FIG. 5 displays the dichroic properties of a PL film of 2% w/w of DMC/UHMW-PE with a draw ratio of 80 (PL film B). Top: polarized absorption spectra recorded for incident light polarized parallel (solid line) and perpendicular (dashed line) to the PL film orientation axis. Bottom: polarized PL emission spectra measured under isotropic excitation at 365 nm, through a linear polarizer (analyzer) with its polar axis parallel (solid line) and perpendicular (dashed line) to the PL film orientation axis, using unpolarized excitation light.

Essentially isotropic absorption and emission were observed for the highly oriented PL films prepared in this example. A PL film containing 2% w/w of DMC with a draw ratio of 80 (in the below examples referred to as PL film B) was characterized by an emission dichroic ratio of 1.5 and an absorption dichroic ratio of 1.3 when measured at an excitation wavelength of 365 nm, that is, at the maximum of the DMC main absorption band (FIG. 5). A PL film containing 2% w/w of C138 with a draw ratio of 90 was characterized by an emission dichroic ratio of 2.2 and an absorption dichroic ratio of 2.0 when measured at an excitation wavelength of 365 nm, that is, at the maximum of the C138 main absorption band.

This experiment clearly demonstrates that a modification of the prior art method, which yields PL films containing only sensitizers of low form-anisotropy and a carrier polymer, does not result in PL polarizers that are characterized in a low degree of polarization in absorption and a high degree of polarization in emission.

EXAMPLE 1

PL Polarizer Comprising Sensitizer, Emitter and Carrier Polymer

PL materials comprising 1, 2 or 4% w/w DMC as the sensitizer, 0.2, 1 or 2% w/w EHO-OPPE of a $M_n$ of 10,000 gmol$^{-1}$ as the emitter and UHMW-PE as a carrier polymer were prepared by casting a solution of the sensitizer (5 or 10 mg), emitter (5 or 10 mg) and UHMW-PE (0.5 g) in xylene (50 g) (dissolution at 130° C. after degassing the mixture in vacuum at 25° C. for 15 min.) into a petri-dish of 11 cm in diameter. The resulting gels were dried under ambient conditions for 24 h to yield unoriented blend films which had a homogeneous thickness of about 70 μm. These films were drawn at temperatures of 90–120° C. on a thermostatically controlled hot shoe to a series of different draw-ratios (λ=final length/initial length) that ranged from 10 to 80. Draw ratios were calculated from the displacement of distance marks printed on the films prior to drawing. The oriented PL films or PL polarizers thus obtained had a thickness in the range from about 1 to about 10 μm.

Figure 6:
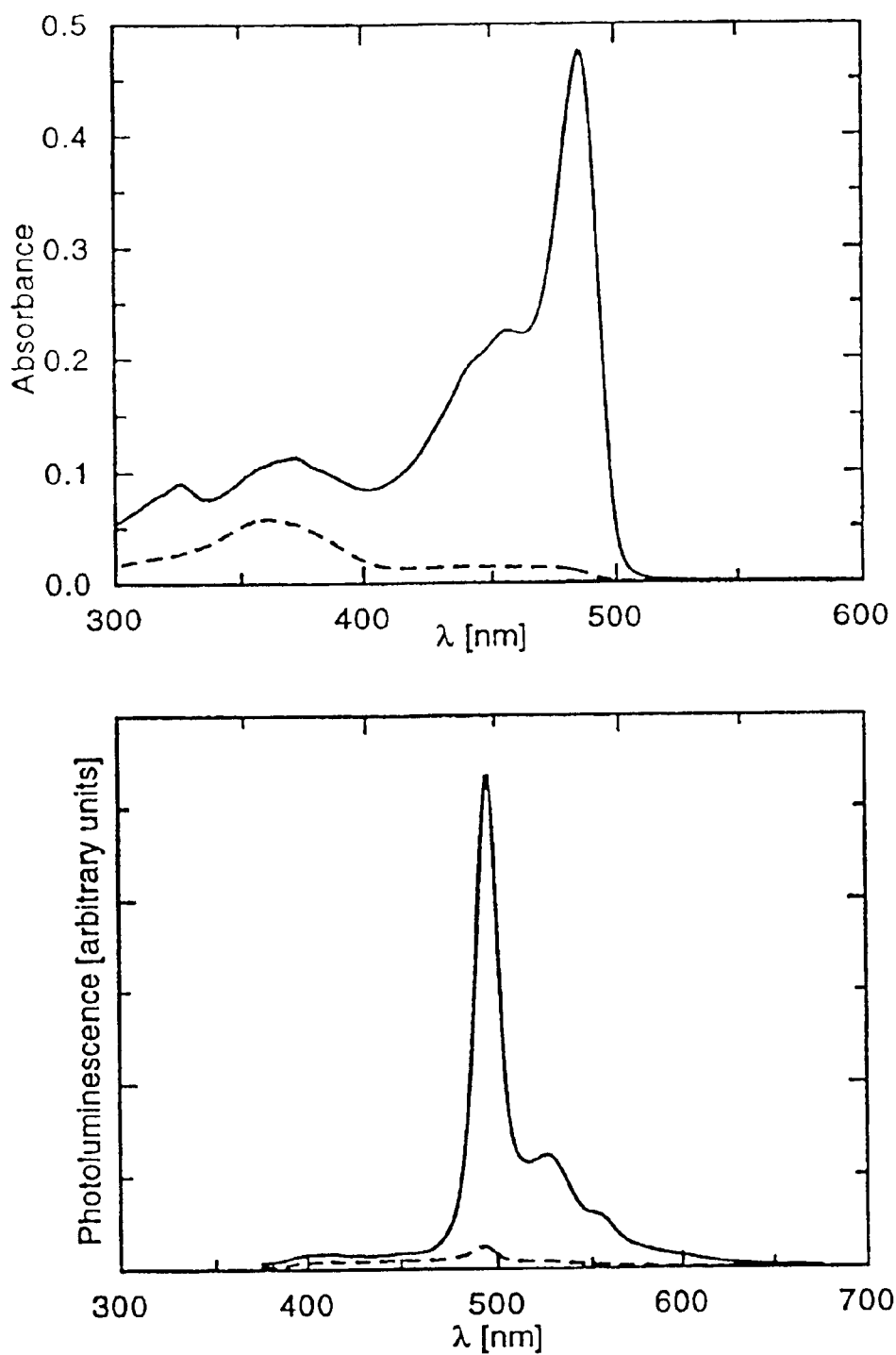
FIG. 6 displays the dichroic properties of a PL polarizer of 2% w/w of EHO-OPPE/DMC/UHMW-PE with a draw ratio of 80 (PL polarizer 1). Top: polarized absorption spectra recorded for incident light polarized parallel (solid line) and perpendicular (dashed line) to the PL polarizer axis. Bottom: polarized PL emission spectra measured under isotropic excitation at 365 nm, through a linear polarizer (analyzer) with its polar axis parallel (solid line) and perpendicular (dashed line) to the PL polarizer axis, using unpolarized excitation light.
Figure 7:
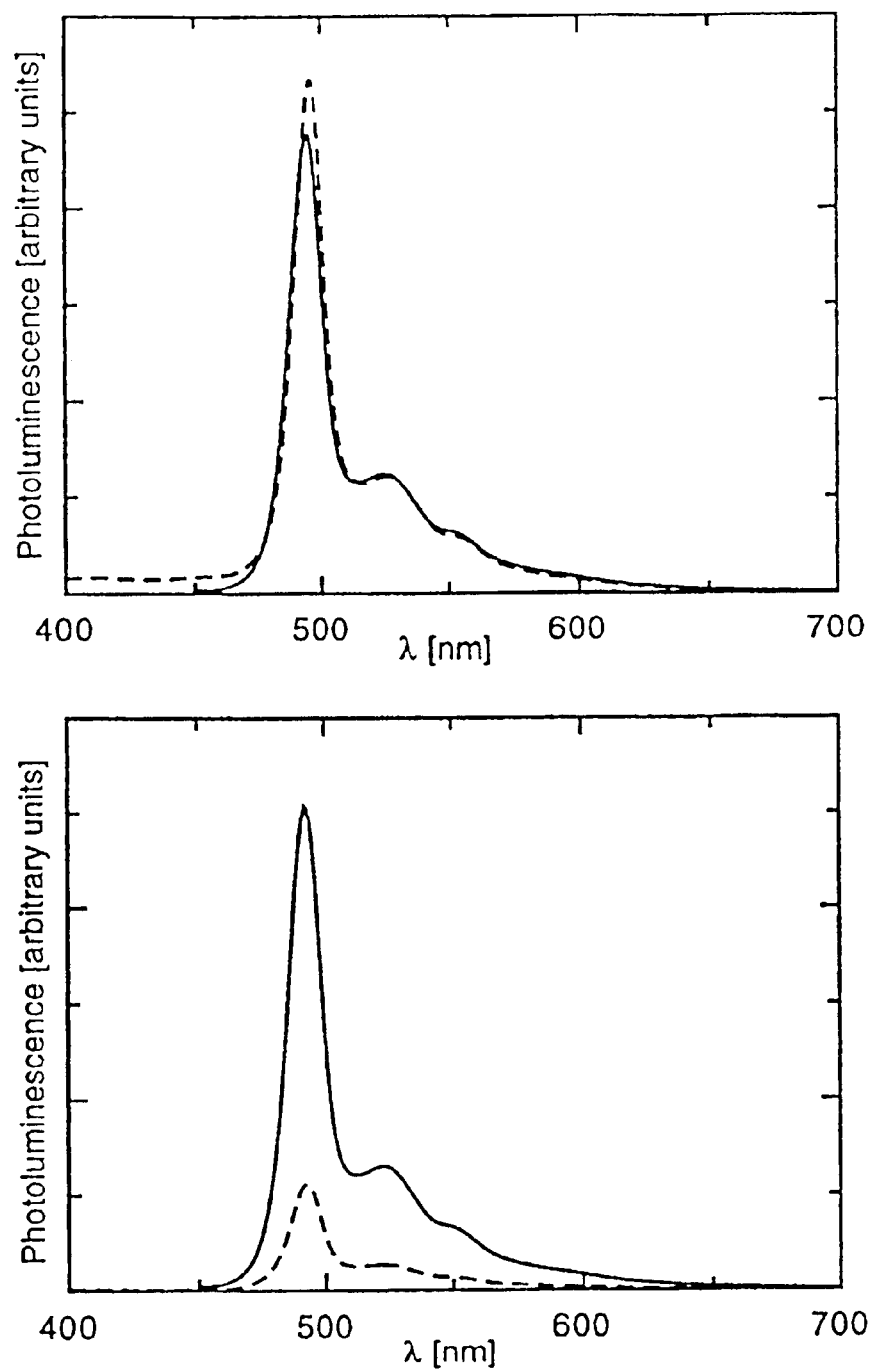
FIG. 7 displays PL emission spectra of a PL polarizer of 2% w/w of EHO-OPPE/DMC/UHMW-PE with a draw ratio of 80 (PL polarizer 1) (top) and a PL polarizer of 2% w/w of EHO-OPPE/UHMW-PE with a draw ratio of 80 (PL polarizer A) (bottom), obtained under isotropic excitation at 440 (solid line) and 365 nm (dashed line), and detection through a linear polarizer (analyzer) with its polar axis parallel and perpendicular to the PL polarizer axis.

An essentially isotropic absorption and a highly polarized emission were observed for the oriented PL polarizers prepared in this example as visualized in FIG. 6 for a PL polarizer comprising 2% w/w of DMC and 2% w/w of EHO-OPPE with a draw ratio of 80. This particular PL polarizer (in the below examples referred to as PL polarizer 1) was characterized by an emission dichroic ratio of 16 and an absorption dichroic ratio of 1.5 when measured at an excitation wavelength of 365 nm, that is, at the maximum of the DMC-sensitizer main absorption band. As can be seen from FIG. 6, importantly, the DMC emission is almost fully suppressed; this is in contrast to the strong DMC emission observed for PL film B (FIG. 5) which contains an equal amount of DMC. Energy transfer from the DMC sensitizer to the EHO-OPPE emitter is fully evident when comparing the emission intensities (related to EHO-OPPE) of PL polarizer 1 (top) and PL polarizer A (bottom) (FIG. 7) for isotropic excitation at 440 nm (solid line) and 365 nm (dashed line), respectively. PL polarizer A, prepared according to the prior art, shows a significantly lower emission intensity when excited at 365 nm compared to excitation at 440 nm, due to the much lower absorption of the EHO-OPPE emitter at the shorter wavelength (FIG. 3). PL polarizer 1, by contrast, shows similar emission intensities when excited at 365 and 440 nm. as a result of the sensitizing effect of DMC: the effective, isotropic absorption of the sensitizer, followed by energy transfer to the emitter, is the rationalisation for the increased emission intensity.

Figure 8:
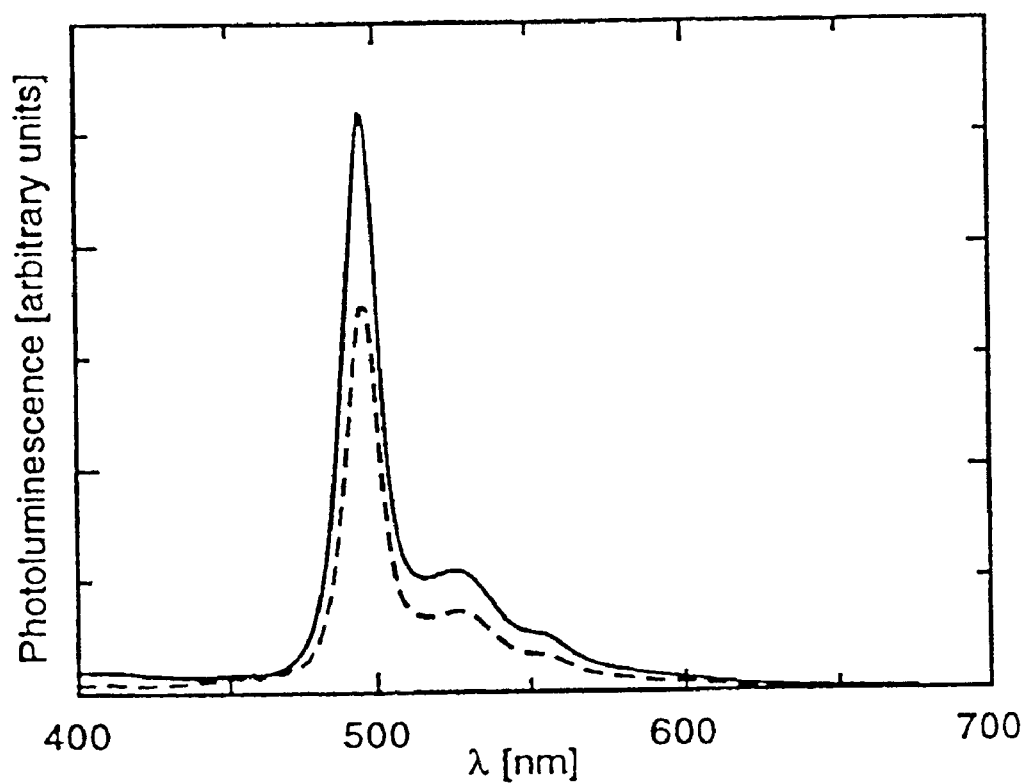
FIG. 8 displays PL emission spectra of a PL polarizer of 2% w/w of EHO-OPPE/DMC/UHMW-PE with a draw ratio of 80 (PL polarizer 1), obtained under excitation at 365 nm with excitation light polarized parallel (solid line) and perpendicular (dashed line) to the PL polarizer axis and detection through a linear polarizer (analyzer) with its polar axis parallel to the PL polarizer axis.

The polarizing characteristic of the energy transfer is demonstrated by the results presented in FIG. 8. The emission intensity from PL polarizer 1 was found to be only weakly depending on the polarization of the incident light (when excited at 365 nm). In fact, the ratio of the emission intensities for excitation with light polarized parallel and perpendicular to the PL polarizer axis (1.5) is in agreement with the slightly dichroic absorption of the PL polarizer at 365 nm (1.5, see above). Thus, PL polarizer 1, which is a preferred embodiment of the present invention, exhibits the phenomenon of polarizing energy transfer: optical energy is isotropically absorbed by the DMC sensitizer, with similar efficiency for both absorption (excitation) polarizations transferred to the EHO-OPPE emitter, which subsequently emits polarized light.

Figure 9:
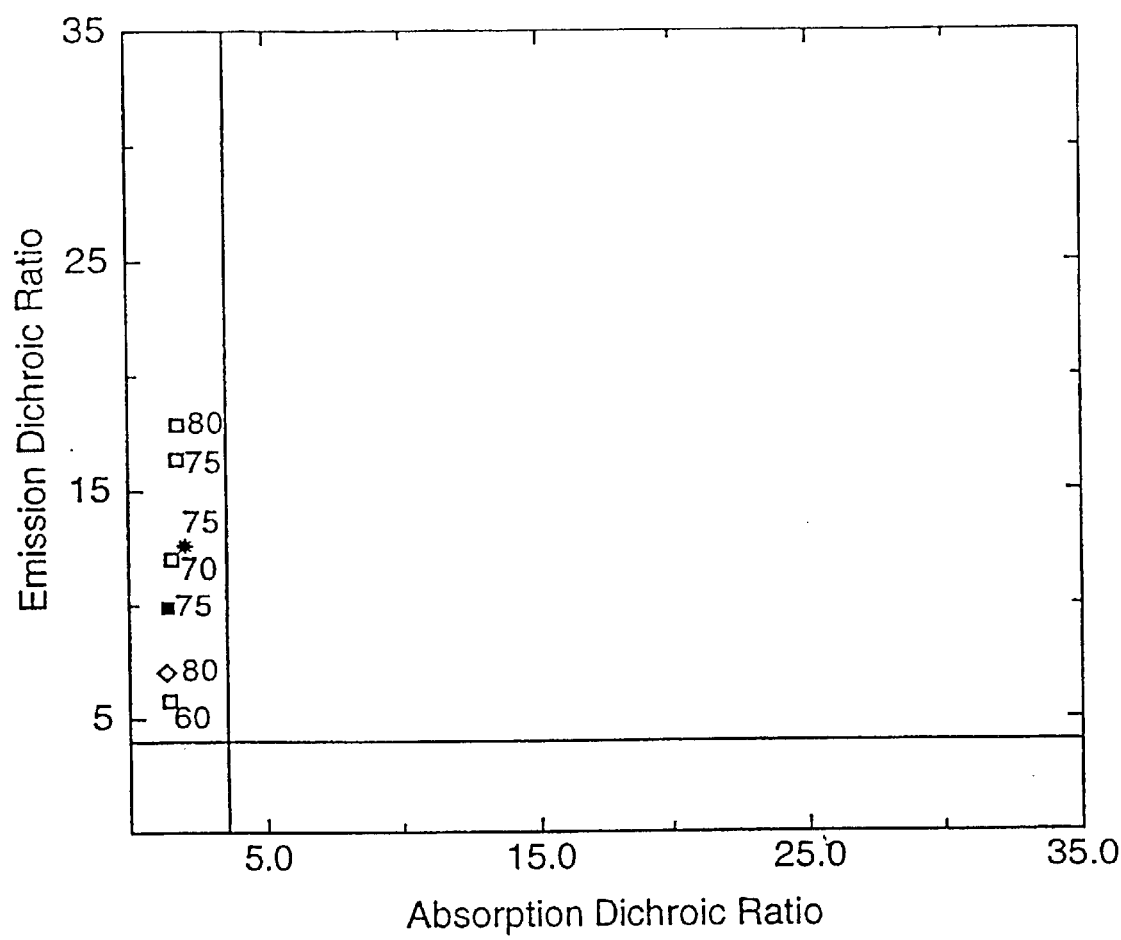
FIG. 9 is a plot of emission dichroic ratio versus absorption dichroic ratio for various PL polarizers according to the invention, comprising DMC as sensitizer and EHO-OPPE as emitter, as a function of draw ratio (given in the graph) and composition; the absorption dichroic ratio was measured at the excitation wavelength of 365 nm and emission dichroic ratios were measured under isotropic excitation at 365 nm.

The influence of the draw ratio and the composition of the blends on the dichroic properties of the PL polarizers prepared in this example as preferred embodiments of the present invention are summarized in FIG. 9; the absorption dichroic ratio was measured at the excitation wavelength of 365nm and emission dichroic ratios were measured under isotropic excitation at 365 nm.

This experiment demonstrates that PL polarizers according to the present invention which comprise a sensitizer and an emitter and in this example a carrier polymer, are characterized in a low degree of polarization in absorption and a high degree of polarization in emission. Moreover, this experiment demonstrates that the method claimed inhere, indeed yields preferred embodiments of the invention.

EXAMPLE 2
PL Polarizer Comprising Sensitizer, Emitter and Carrier Polymer

Figure 10:
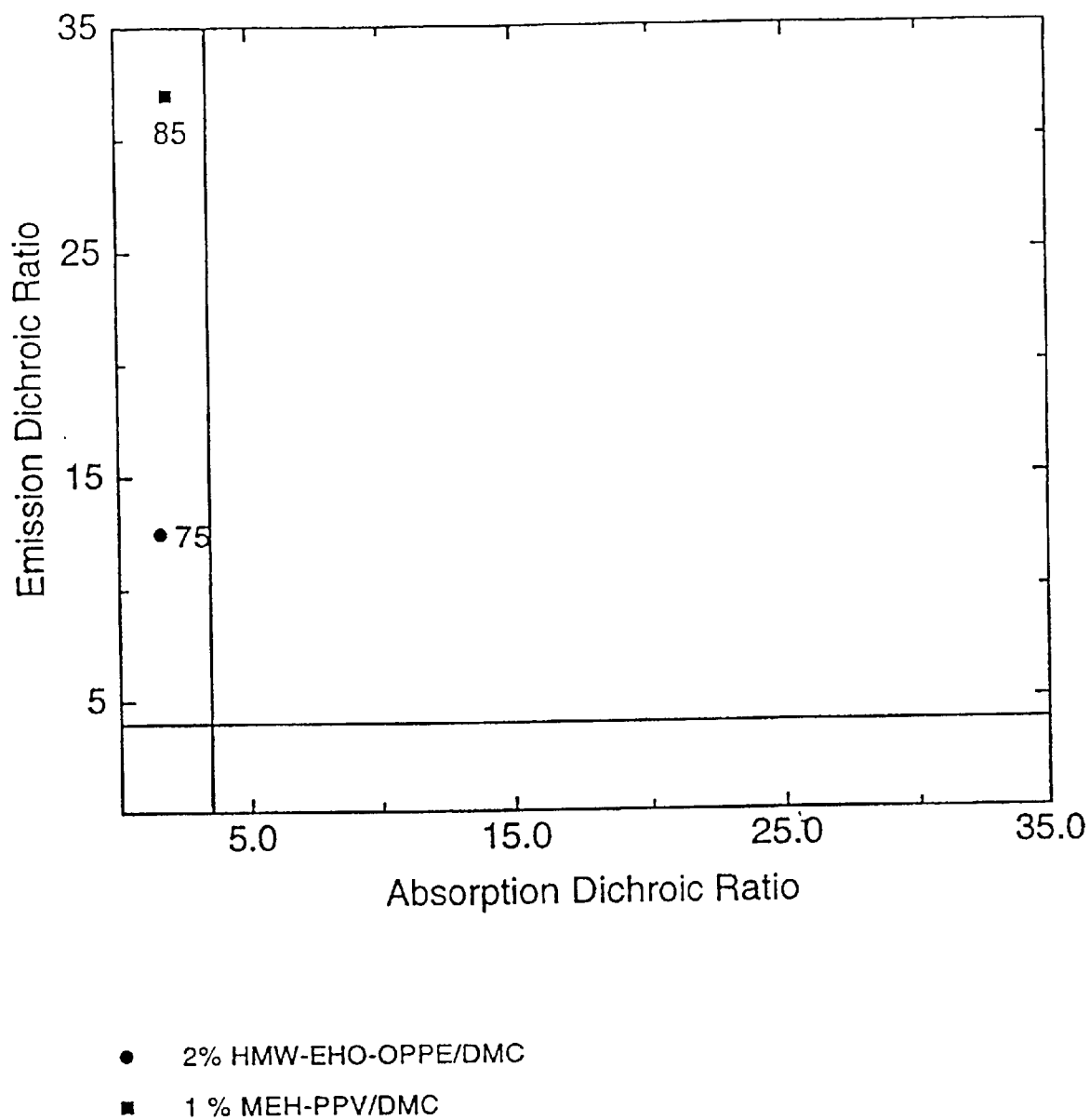
FIG. 10 is a plot of emission dichroic ratio versus absorption dichroic ratio for various PL polarizers according to the invention, comprising DMC as sensitizer and EHO-OPPE, O-OPPE, MEH-PPV as emitter as a function of draw ratio (given in the graph), and the chemical structure of the emitter; the absorption dichroic ratio was measured at the excitation wavelength of 365nm and emission dichroic ratios were measured under isotropic excitation at 365 nm.

Example 1 was repeated with alternatively EHO-OPPE of a $M_n$ of 84,000 gmol$^{-1}$, and MEH-PPV of a $M_w$ of 450,000 gmol$^{-1}$ as the emitter. Their dichroic ratios measured in emission and absorption are shown in FIG. 10, data are given for an excitation wavelength of 365 nm which was chosen to match the absorption maximum of the sensitizer. As in the case of PL polarizer 1, importantly, the DMC emission is almost fully suppressed in the PL polarizers prepared in this experiment.

This experiment demonstrates that a variety of emitters can be used to produce PL polarizers which, according to the present invention, comprise a sensitizer and an emitter and, in this example, a carrier polymer, and are characterized in a low degree of polarization in absorption and a high degree of polarization in emission.

EXAMPLE 3
PL Polarizer Comprising Sensitizer, Emitter and Carrier Polymer

Figure 11:
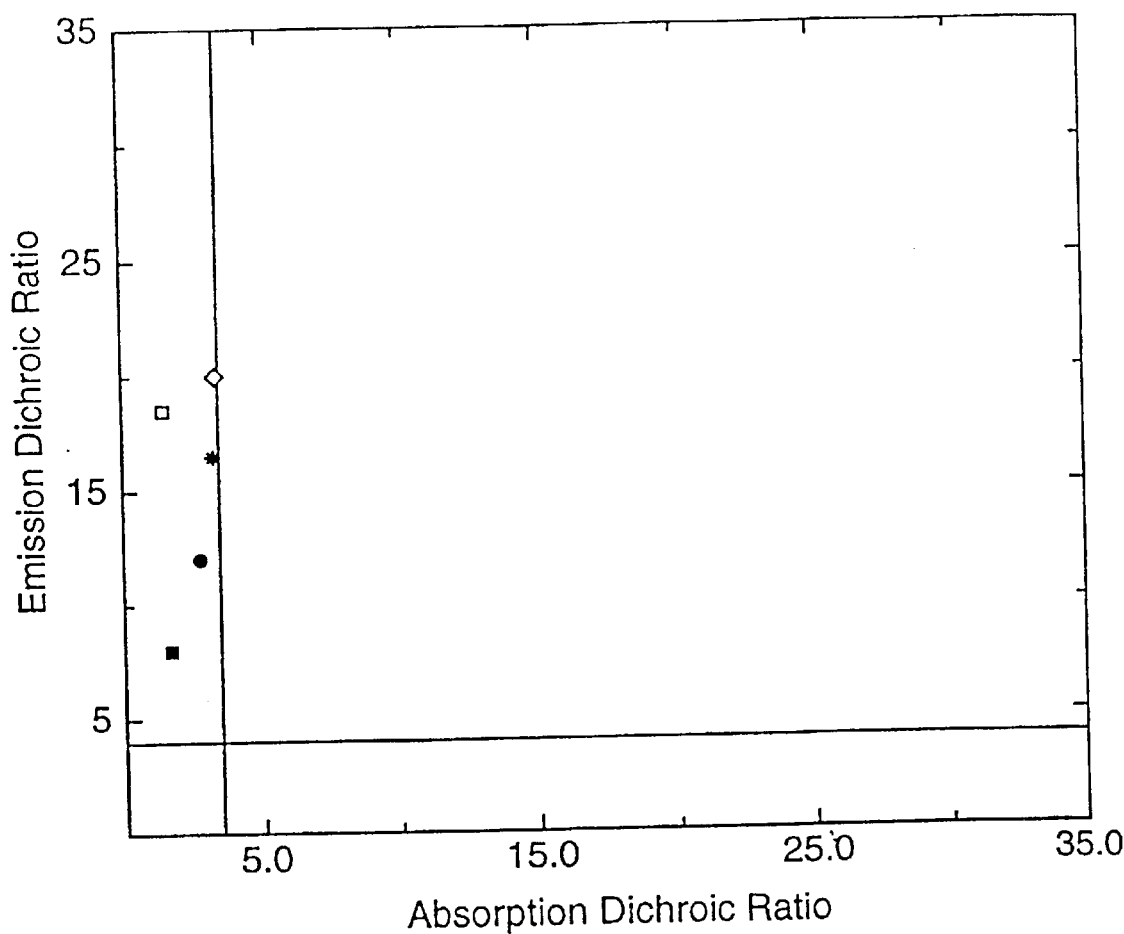
FIG. 11 is a plot of emission dichroic ratio versus absorption dichroic ratio for various PL polarizers according to the invention, comprising various sensitizers (C138, BPO, BPEB, PAC, MOC) and EHO-OPPE as emitter as a function of the chemical structure of the sensitizer. The films comprised 2% w/w of the respective sensitizer and 2% w/w of EHO-OPPE, and were characterized by a draw ratio of about 80. Their dichroic ratios in absorption were measured at the excitation wavelengths indicated in the figure, and emission dichroic ratios were measured under isotropic excitation at the indicated excitation wavelengths.

Example 1 was repeated with alternatively C138, BPO, BPEB, MOC or PAC as the sensitizer. The PL polarizers prepared in this example comprised 2% w/w of the respective sensitizer and 2% w/w of EHO-OPPE, and were characterized by a draw ratio of about 80. Their dichroic ratios measured in emission and absorption are shown in FIG. 11; data are given for the excitation wavelength indicated in the figure, which usually was chosen to match the absorption maximum of the sensitizer. An essentially isotropic absorption and a highly polarized emission were observed for the oriented PL polarizers prepared in this example. As in the case of PL polarizer 1, importantly, the sensizizer emission is almost fully suppressed in the PL polarizers prepared in this experiment.

This experiment demonstrates that alternative sensitizers can be used to produce PL polarizers which, according to the present invention, comprise a sensitizer and an emitter and, in this example, a carrier polymer, and are characterized in a low degree of polarization in absorption and a high degree of polarization in emission.

EXAMPLE 4
PL Polarizer Comprising a Multifunctional Copolymer and Carrier Polymer Example 1 was repeated with the copolymer designated ANT-OPPE the chemical structure of which was given heretofore and which was prepared according to Example A. A PL polarizer comprising 2% w/w ANT-OPPE with a draw ratio of 80 was characterized by an emission dichroic ratio of 17 and an absorption dichroic ratio of 1.5 when measured at an excitation wavelength of 365 nm. Also in case of this PL polarizer, emission of the sensitizer, due to the presence of the polarizing energy transfer, is almost fully suppressed.

This experiment demonstrates that sensitizer and emitter can be combined in one species, for example, as shown here, by producing copolymers which which combine sensitizer and emitter moieties. Importantly, the experiment shows that these multifunctional materials also allow to produce PL polarizers which, according to the present invention, comprise a sensitizer and an emitter and, in this example, a carrier polymer, and which are characterized in a low degree of polarization in absorption and a high degree of polarization in emission.

EXAMPLE 5
PL Polarizer Comprising Sensitizer, Emitter and Carrier Polymer

PL materials comprising 2% w/w DMC as the sensitizer, 2% w/w EHO-OPPE of a $M_n$ of 10,000 gmol$^{-1}$ as the emitter and HDPE as a carrier polymer were prepared by mixing the sensitizer (20 mg), emitter (20 mg) and HDPE (1.0 g) for 1 min at 150° C. in a twin-screw extruder (DACA Instruments) and extruding the mixture. The resulting material was compression moulded between two aluminium plates (area: 416 cm$^2$) for 5 min at 150° C., applying a pressure of 3–5 metric tons to yield unoriented blend films which had a homogeneous thickness of about 80 μm. These films were drawn at temperatures of 90–120° C. on a thermostatically controlled hot shoe to a series of different draw-ratios (λ=final length/initial length) that ranged from 5 to 20. Draw ratios were calculated from the displacement of distance marks printed on the films prior to drawing. The oriented PL films or PL polarizers thus obtained had a thickness in the range from about 4 to about 15 μm.

An essentially isotropic absorption and a highly polarized emission were observed for the oriented PL polarizers prepared in this example. A PL polarizer prepared according to this method with a draw ratio of 19 was characterized by an emission dichroic ratio of 8 and an absorption dichroic ratio of 1.7 when measured at an excitation wavelength of 365 nm, that is, at the maximum of the DMC-sensitizer main absorption band. Also in case of this PL polarizer, emission of the sensitizer, due to the presence of the polarizing energy transfer, is almost fully suppressed.

This experiment demonstrates that one of the methods claimed herein, indeed yields preferred embodiments of the present invention.

EXAMPLE 6
Improvement in PL Polarizer Brightness

As direct indication for the practical impact of the polarizing energy transfer in PL polarizers according to the present invention, the absolute brightness of PL polarizers was measured under isotropic excitation with a 365 nm UV lamp (Bioblock, VL-4LC, 4 Watts). The luminosity of a PL polarizer according to the present invention (PL polarizer 1) is dramatically increased (82 cd/m$^2$), compared to the corresponding prior art element (PL polarizer A) (22 cd/m$^2$) of similar optical density in the emitter-regime. The absolute brightness of the PL polarizer according to the present invention can be further enhanced, for example, by an increase in optical density.

EXAMPLE 7

Improvement In Display Brightness

A display device was constructed according to the schematic of FIG. 1A. A UV lamp (Bioblock, VL-4LC, 4 Watts)c, operated at 365 nm, was employed as a light source. PL polarizer 1 was used as the PL polarizer (2), and was placed in between the UV source and a commercial liquid crystal display, consisting of a patterned electrooptical light valve (3) and one absorbing polarizer (2), arranged as shown in FIG. 1A. Selected patterns of the display device (segments) were switched between the "on" and the "off" state. The switching yielded a significant change in brightness that was perceived by the human eye as a change from a very bright yellow-green to almost dark. In order to quantify the observed outstanding brightness and contrast, the absolute brightness of the "on" and "off" state was measured with a Minolta LS 100 luminance meter, which was fitted with a No 110 and a No 122 close-up lens. The brightness was measured to be in excess of 100 cd m$^{-2}$ for the "on" state and less than about 15 cd m$^{-2}$ for the "off" state. An otherwise identical device comprising PL polarizer A (which was of similar optical density in the emitter-regime) exhibited a brightness of only 30 cd m$^{-2}$.

This example shows that the use of the PL polarizers according to this invention, yields display devices of highly improved brightness and, consequently energy efficiency when compared to the prior art.

What is claimed is:

1. A photoluminescent polarizer characterized in that it comprises at least one sensitizer and at least one oriented emitter and that is further characterized in a low degree of polarization in its absorption at a wavelength that can be employed for photoexcitation and a high degree of polarization in its emission, wherein said low degree of polarization in absorption is characterized by a dichroic ratio of less than about 3.5 and wherein said high degree of polarization in emission is characterized by a dichroic ratio of more than about 4.

2. A photoluminescent polarizer according to claim 1, wherein said low degree of polarization in absorption is characterized by a dichroic ratio of less than about 3.0.

3. A photoluminescent polarizer according to claim 1, wherein said low degree of polarization in absorption is characterized by a dichroic ratio of less than about 2.0.

4. A photoluminescent polarizer according to claim 1, wherein said low degree of polarization in absorption is characterized by a dichroic ratio of less than about 1.5.

5. A photoluminescent polarizer according to one of claims 1–4, wherein said high degree of polarization in emission is characterized by a dichroic ratio of more than about 10.

6. A photoluminescent polarizer according to one of claims 1–4, wherein said high degree of polarization in emission is characterized by a dichroic ratio of more than about 15.

7. A photoluminescent polarizer according to one of claims 1–4, wherein said photoluminescent polarizer comprises at least one sensitizer and at least one emitter that is chemically distinct from said sensitizer.

8. A photoluminescent polarizer according to one of claims 1–4, wherein said sensitizer and emitter are combined in one species and/or moiety and/or domain.

9. A photoluminescent polarizer according to one of claims 1–4, wherein said photoluminescent polarizer comprises at least one carrier polymer.

10. A photoluminescent polarizer according to one of claims 1–4, wherein said emitter is an organic species.

11. A photoluminescent polarizer according to one of claim 1–4, wherein said emitter is a polymer.

12. A photoluminescent polarizer according to one of claims 1–4, wherein said emitter is a conjugated polymer.

13. A photoluminescent polarizer according to one of claims 1–4, wherein said emitter is a poly(p-phenyleneethynylene) derivative.

14. A photoluminescent polarizer according to one of claims 1–4, wherein said emitter is a poly(p-phenylenevinylene) derivative.

15. A photo luminescent polarizer according to one of claims 1–4, wherein said sensitizer is an organic species.

16. A photoluminescent polarizer according to one of claims 1–4, wherein said sensitizer is a polymer.

17. A photoluminescent polarizer according to one of claims 1–4, wherein said sensitizer is an inorganic species.

18. A photoluminescent polarizer according to one of claims 1–4, wherein said sensitizer is selected from the group DMC, C138, BPO, BPEB, PAC, MOC.

19. A photoluminescent polarizer according to one of claims 1–4, wherein said carrier polymer is selected from the group poly(ethylene), poly(propylene), poly(vinylalcohol), poly(acrylonitril).

20. A photoluminescent polarizer according to one of claims 1–4, wherein said photoluminescent polarizer is made by a technique selected from the group consisting of tensile orientation, oriented growth, friction, photo-induced alignment, sorption into oriented carrier films, and alignment in electric, magnetic and flow fields or combinations thereof.

21. An optoelectronic display device of high brightness and high contrast comprising at least one photoluminescent polarizer, wherein said photoluminescent polarizer comprises at least one sensitizer and at least one emitter.

22. A display device according to claim 21 wherein said display device additionally comprises at least one electrooptical light valve.

23. A display device according to claim 22 wherein said electrooptical light valve includes a liquid crystal cell having a liquid crystal layer which is electrically switchable between an operative state and inoperative state.

24. A display device according to one of claims 21–23 wherein said device comprises at least one absorbing polarizer.

25. A display device according to one of claims 21–23 wherein said device comprises an additional photoluminescent polarizer that is characterized in a high degree of polarization in its absorption at the wavelength employed for photoexcitation, wherein said high degree of polarization in absorption is characterized by a dichroic ratio of more than about 5.

26. A display device according to claim 25 wherein said additional photoluminescent polarizer has a thickness of less than 50 μm.

27. A display device according to claim 25 wherein said additional photoluminescent polarizer is located inside said electrooptical light valve.

28. A display device according to claim 25 wherein said additional polarized photoluminescent layer is located inside said electrooptical light valve and acts as orientation layer.

29. A display device according to one of claims 21–23 wherein said photoluminescent polarizer is patterned.

30. A display device according to one of claims 21–23 that additionally comprises a light source wherein said light source is characterized in that its emission spectrum overlaps with the absorption spectrum of said sensitizer.

31. A display device according to one of claims 21–23 comprising at least one photoluminescent polarizer characterized in that it comprises at least one sensitizer and at least one oriented emitter and that is further characterized in a low degree of polarization in its absorption at a wavelength that can be employed for photoexcitation and a high degree of polarization in its emission, wherein said low degree of polarization in absorption is characterized by a dichroic ratio of less than about 3.5 and wherein said high degree of polarization in emission is characterized by a dichroic ratio of more than about 4.

32. A display device according to one of claims 21–23 comprising at least one photoluminescent polarizer characterized in that it comprises at least one sensitizer and at least one oriented emitter and that is further characterized in a low degree of polarization in its absorption at a wavelength that can be employed for photoexcitation and a high degree of polarization in its emission, wherein said low degree of polarization in absorption is characterized by a dichroic ratio of less than about 3.5, wherein said high degree of polarization in emission is characterized by a dichroic ratio of more than about 4, and wherein said low degree of polarization in absorption is characterized by a dichroic ratio of less than about 3.0.

33. A display device according to one of claims 21–23 comprising at least one photoluminescent polarizer characterized in that it comprises at least one sensitizer and at least one oriented emitter and that is further characterized in a low degree of polarization in its absorption at a wavelength that can be employed for photoexcitation and a high degree of polarization in its emission, wherein said low degree of polarization in absorption is characterized by a dichroic ratio of less than about 3.5, wherein said high degree of polarization in emission is characterized by a dichroic ratio of more than about 4, and wherein said low degree of polarization in absorption is characterized by a dichroic ratio of less than about 2.0.

34. A display device according to one of claims 21–23 comprising at least one photoluminescent polarizer characterized in that it comprises at least one sensitizer and at least one oriented emitter and that is further characterized in a low degree of polarization in its absorption at a wavelength that can be employed for photoexcitation and a high degree of polarization in its emission, wherein said low degree of polarization in absorption is characterized by a dichroic ratio of less than about 3.5, wherein said high degree of polarization in emission is characterized by a dichroic ratio of more than about 4, and wherein said low degree of polarization in absorption is characterized by a dichroic ratio of less than about 1.5.

35. A photoluminescent polarizer which comprises at least one sensitizer and at least one oriented emitter and that is characterized in a low degree of polarization in its absorption at a wavelength that can be employed for photoexcitation, and that is further characterized in a circularly polarized emission, wherein said low degree of polarization in absorption is characterized by a dichroic ratio of less than about 3.5.

36. A photoluminescent polarizer according to claim 35, comprising at least one first species and/or moiety and/or domain and at least one second species and/or moiety and/or domain, wherein said first species gives rise to a substantial, essentially isotropic absorption at at least one wavelength than can be used for photoexcitation; and said first species is further characterized in that it at least partially transfers the absorbed energy to at least one said second species giving rise to a significantly circularly polarized photoemission of said photoluminescent polarizer.

37. A photoluminescent polarizer which comprises at least one sensitizer and at least one oriented emitter and that is characterized in a low degree of polarization in its absorption at a wavelength that can be employed for photoexcitation, and that is further characterized in an elliptically polarized emission, wherein said low degree of polarization in absorption is characterized by a dichroic ratio of less than about 3.5.

38. A photoluminescent polarizer according to claim 35, comprising at least one first species and/or moiety and/or domain and at least one second species and/or moiety and/or domain, wherein said first species gives rise to a substantial, essentially isotropic absorption at at least one wavelength that can be used for photoexcitation; and said first species is further characterized in that it at least partially transfers the absorbed energy to at least one said second species giving rise to a significantly elliptically polarized photoemission of said photoluminescent polarizer.

39. A photoluminescent polarizer that is characterized in a high degree of polarization in its absorption at a wavelength that can be employed for photoexcitation, and that is characterized in a low degree of polarization in its emission, wherein said high degree of polarization in absorption is characterized by a dichroic ratio more than about 4 and wherein said low degree of polarization in emission is characterized by a dichroic ratio of less than about 3.5, and which comprises at least one first species and/or moiety and/or domain which gives rise to said high degree of polarization in absorption and which comprises at least one second species and/or moiety and/or domain which gives rise to said low degree of polarization in emission; said first species and/or moiety and/or domain being further characterized in that it at least partially transfers the absorbed energy to said at least one second species and/or moiety and/or domain.

* * * * *